(12) United States Patent
Rebane

(10) Patent No.: US 6,662,192 B1
(45) Date of Patent: Dec. 9, 2003

(54) SYSTEM AND METHOD FOR DATA COLLECTION, EVALUATION, INFORMATION GENERATION, AND PRESENTATION

(75) Inventor: George J. Rebane, Topanga, CA (US)

(73) Assignee: Bizrate.com, Los Angeles, CA (US)

( * ) Notice: Subject to any disclaimer, the term of this patent is extended or adjusted under 35 U.S.C. 154(b) by 0 days.

(21) Appl. No.: 09/538,569

(22) Filed: Mar. 29, 2000

(51) Int. Cl.[7] ................................................ G06F 7/00
(52) U.S. Cl. .................................... 707/104.1; 707/10
(58) Field of Search ........................ 707/104.1, 10; 705/35, 10; 725/20

(56) References Cited

U.S. PATENT DOCUMENTS

| | | | |
|---|---|---|---|
| 5,893,098 A | 4/1999 | Peters et al. ................... 707/10 |
| 5,915,243 A | 6/1999 | Smolen ......................... 705/14 |
| 5,956,709 A | 9/1999 | Xue ............................... 707/3 |
| 5,983,220 A | 11/1999 | Schmitt ......................... 707/5 |
| 5,991,735 A | 11/1999 | Gerace ........................ 707/10 |
| 6,128,624 A | * 10/2000 | Papierniak et al. ........ 707/104.1 |
| 6,131,085 A | 10/2000 | Rossides ........................ 705/1 |
| 6,151,584 A | * 11/2000 | Papiernaik et al. ........... 705/10 |
| 6,202,210 B1 | * 3/2001 | Ludtke ......................... 725/20 |
| 6,349,290 B1 | * 2/2002 | Horowitz et al. ............. 705/35 |
| 2001/0014868 A1 | 8/2001 | Herz et al. ..................... 707/1 |

OTHER PUBLICATIONS

Hagel III, John and Singer, Marc; *Net Worth;* 1999; pp. 261–284; Harvard Business School Press; Boston, Massachusetts.

* cited by examiner

*Primary Examiner*—Diane D. Mizrahi
(74) *Attorney, Agent, or Firm*—Ganz Law, PC; Bradley M. Ganz

(57) ABSTRACT

The present invention relates to a system and method for data collection, evaluation, information generation and/or presentation. More, particularly the present invention relates to a system for collecting, evaluating, generating, and presenting data and/or information relating to electronic commerce. The system and methods of the present invention include a module for stabilizing small or noisy samples of data, including the prediction of missing observations.

72 Claims, 30 Drawing Sheets

EVALUATION FOR: Online Merchant    FIG. 1a

How satisfied were you? Use a ten-pont rating scale to rate your satisfaction with Online Merchant and this purchse as it applies to:

|  | How Satisfied Were You? | | | | | | | | | | |
|---|---|---|---|---|---|---|---|---|---|---|---|
|  | Not at all | | A Little | | Some- what | | Quite a Bit | | Highly | | |
|  | 1 | 2 | 3 | 4 | 5 | 6 | 7 | 8 | 9 | 10 | NA |
| 102 Ease of Ordering<br>Consider: Convenience and speed of ordering | ○ | ○ | ○ | ○ | ○ | ○ | ○ | ○ | ○ | ● | ○ |
| 104 Product Selection<br>Given site focus: Breadth/depth of products offered | ○ | ○ | ○ | ○ | ○ | ○ | ○ | ○ | ○ | ● | ○ |
| 106 Product information<br>Consider: Information quantity, quality & relevence | ○ | ○ | ○ | ○ | ○ | ○ | ○ | ○ | ● | ● | ○ |
| 108 Product Prices<br>Consider: Prices relative to similar merchandise | ○ | ○ | ○ | ○ | ○ | ○ | ○ | ○ | ● | ○ | ○ |
| 110 Web Site Navigation & Looks<br>Consider: Layout. brokrn links/pictures/images & speed | ○ | ○ | ○ | ○ | ○ | ○ | ● | ● | ○ | ○ | ○ |

100

112

Shopping on the Web

What was the total dollar value of this purchase?
(Include shipping & handling -- round to the nearest dollar)

US $ [        ]

How many items were included in this purchase? (do not include free items)

Total # Items [ --Select-- ▼ ]

Of the items included in this purchase, what percentage were Gifts?

| 0% | 1% - 25% | 26% - 50% | 51% - 75% | 76% - 100% |
|---|---|---|---|---|
| ○ | ○ | ○ | ○ | ○ |

Please indicate what prompted you to make this visit to Online Merchant's web site?

| Web | --Select-- ▼ |
|---|---|
| Print | --Select-- ▼ |
| TV | --Select-- ▼ |
| Radio | --Select-- ▼ |
| Alternative | --Select-- ▼ |

| If "Other," please specify | |
|---|---|

Merchants often offer a wide array of online tools, features & offerings to optimize your shopping experience. Please help us identify which tools, features & offerings are most useful to you. Considering the purchase you have just made, please indicate the three most helpful/influential/inportant resources from the list below:
(check up to 3)

☐ New Products Page - product purchased was featured on merchant's "New Products" page ☐ Best Sellers Page - product purchased was featured on merchant's "Best Sellers" page ☐ Featured Sale Item - product purchased was an advertised special on merchant's site ☐ Product Recommendation - product purchased was recommended by the merchant ☐ Product Search Tools - product purchased was located using merchant's product search tool/engine ☐ Gift Registry - product purchased was ordered using merchant's gift registry service ☐ Online Product Review - product purchased was described in an independent review on the merchant's site ☐ Discounted Shipping - product purchased qualified for a shipping discount offer from the merchant ☐ Online Coupon - product purchased qualified for an online coupon offer from the merchant ☐ Club Rewards Program - benefits associated with merchant's frequent buyer club or program ☐ Personalized Site Features - ability to save customized personal information & other saved site features ☐ Express Ordering - ability to process orders with very few page views or express one-click ordering When do you expect all of the items you ordered to be delivered?
--Select-- ▼

How many times over the last six months (180 days) have you made a purchase from Online Merchant's site?
--Select-- ▼

Considering all of your online purchases for the type of product you have just purchased, what percentage of the time do you purchase these types of products from Online Merchant's web site? (consider the past six months (280 days) only

| 1%-25% | 26% - 50% | 51% - 75% | 76% - 100% |
|---|---|---|---|
| ○ | ○ | ○ | ○ |

Please tells us how many times over the last six months (180 days) have you made a purchase anywhere online?
--Select-- ▼

FIG. 1b

Which products did you just purchase from Online Merchant today? Please check all that apply.

Apparel
- ☐ Accessories, Jewelry
- ☐ Clothes
- ☐ Shoes

Computer
- ☐ Computer Hardware
- ☐ Computer Software
- ☐ Consumer Electronics

Consumer Goods
- ☐ Baby Supplies (excluding Clothes)
- ☐ Health and Beauty
- ☐ Prescription and Non-Prescription Drugs
- ☐ Vitamins, Nutritional Supplements

Entertainment
- ☐ Books
- ☐ Music
- ☐ Videos

Food & Wine
- ☐ Chocolate, Candy
- ☐ Coffee, Tea
- ☐ Grocery
- ☐ Wine, Spirits

Gifts
- ☐ Flowers
- ☐ Greeting Cards
- ☐ Novelty Items

Home & Garden
- ☐ Appliances
- ☐ Furniture, Home Furnishings
- ☐ Garden Supplies
- ☐ Housewares
- ☐ Pet Supplies

Other
- ☐ Automotive Parts, Accessories
- ☐ Office Supplies
- ☐ Sporting Goods
- ☐ Tobacco products
- ☐ Tools
- ☐ Toys Other (specify): [_____]

Expectations of the Shopping Experience

Before you made this purchase, you probably had some expectations regarding the overall shopping experiene with Online Merchant. Taking into account the various components of an online purchase. Please indicate your expectation level on the ten-point scale below:

| | Expectations | | | | | | | | | | |
|---|---|---|---|---|---|---|---|---|---|---|---|
| | Very Low | | Low | | Med | | High | | Very High | | |
| | 1 | 2 | 3 | 4 | 5 | 6 | 7 | 8 | 9 | 10 | NA |
| Expectations of This Online Purchase<br>Consider: All the components of an online purchase | O | O | O | O | O | O | O | O | O | O | O |

Shopping Components

Independent of this merchant, how important is each of the following components when shopping online for the types of products you have just purchased?

FIG. 1c

Shopping Components                                    FIG. 1d

| | How Important Is This? | | | | | | | | | | |
|---|---|---|---|---|---|---|---|---|---|---|---|
| | Not at all | | A Little | | Some-what | | Quite a Bit | | Highly | | |
| | 1 | 2 | 3 | 4 | 5 | 6 | 7 | 8 | 9 | 10 | NA |
| Ease of Ordering<br>Consider: Convenience and speed of ordering | O | O | O | O | O | O | O | O | O | O | O |
| Product Selection<br>Given site focus: Breadth/depth of products offered | O | O | O | O | O | O | O | O | O | O | O |
| Product information<br>Consider: Information quantity, quality & relevance | O | O | O | O | O | O | O | O | O | O | O |
| Product Prices<br>Consider: Prices relative to similar merchandise | O | O | O | O | O | O | O | O | O | O | O |
| Web Site Navigation & Looks<br>Consider: Layout. broken links/pictures/images & speed | O | O | O | O | O | O | O | O | O | O | O |
| On-Time Delivery<br>Consider: Expected vs actual delivery date | O | O | O | O | O | O | O | O | O | O | O |
| Product Representation<br>Consider: Product description/depiction vs what you get | O | O | O | O | O | O | O | O | O | O | O |
| Level & Quality of Customer Support<br>Consider: Status updates and complaint/question handling | O | O | O | O | O | O | O | O | O | O | O |
| Posted Product Polices<br>Consider: Online merchant's efforts to Inform you | O | O | O | O | O | O | O | O | O | O | O |
| Product Shipping & Handling<br>Consider: Appropriateness & condition of packaging | O | O | O | O | O | O | O | O | O | O | O |

Tell Us About You

We respect your privacy. The information below will never be divulged in any personally identifiable way.

Sex:
Male O  Female O

Age:
[ --Select-- ▼ ]

Occupation:
[ --Select-- ▼ ]

Your Education:
[ --Select-- ▼ ]

Annual Household income (US $):
[ --Select-- ▼ ]

Your Education:
[ --Select-- ▼ ]

Connection Speed:
[ --Select-- ▼ ]

Home Zip/Postal Code:
[            ]

Country of Residence:
[ --Select-- ▼ ]

If you have children or teens living at home, please check all age groups that apply.
☐ Children under age 2 present
☐ Age 2-5
☐ Age 6-11
☐ Age 12-17

Payment Products

FIG. 1e

Which payment product did you use to make this purchase from Online Merchant?

[ --Select-- ▼ ]

For the following list of payment products in the box below, please indicate in column A which card(s) you own.

Among the payment products you use in the box below, please indicate in column B the three you prefer to use most when making online purchases.
(Answer up to three only for column B.)

| (A)<br>Payment Cards I Own | (B)<br>Preferred Payment Products for Online Purchases |
|---|---|
| ☐ American Express Green | [ Do not use for Internet purchases ▼ ] |
| ☐ American Express Gold | [ Do not use for Internet purchases ▼ ] |
| ☐ American Express Platinum | [ Do not use for Internet purchases ▼ ] |
| ☐ American Express Blue | [ Do not use for Internet purchases ▼ ] |
| ☐ American Express Student Card | [ Do not use for Internet purchases ▼ ] |
| ☐ American Express Senior Member Card | [ Do not use for Internet purchases ▼ ] |
| ☐ American Express Optima Card | [ Do not use for Internet purchases ▼ ] |
| ☐ American Express Optima Platinum Card | [ Do not use for Internet purchases ▼ ] |
| Carte Blanche or Diners | |
| ☐ Carte Blanche Card | [ Do not use for Internet purchases ▼ ] |
| ☐ Diners Club Card | [ Do not use for Internet purchases ▼ ] |
| Discover | |
| ☐ Discover Card | [ Do not use for Internet purchases ▼ ] |
| ☐ Discover Platinum Card | [ Do not use for Internet purchases ▼ ] |
| JCB | |
| ☐ JCB | [ Do not use for Internet purchases ▼ ] |
| MasterCard | |
| ☐ MasterCard Standard (not gold or platinum) | [ Do not use for Internet purchases ▼ ] |
| ☐ Gold MasterCard | [ Do not use for Internet purchases ▼ ] |

| | |
|---|---|
| ☐ Platinum MasterCard | Do not use for Internet purchases ▼ |
| ☐ Maestro | Do not use for Internet purchases ▼ |
| ☐ World MasterCard | Do not use for Internet purchases ▼ |
| ☐ Student MasterCard | Do not use for Internet purchases ▼ |
| ☐ MasterCard Debit Card | Do not use for Internet purchases ▼ |
| ☐ MasterCard BusinessCard | Do not use for Internet purchases ▼ |
| ☐ MasterCard Executive BusinessCard | Do not use for Internet purchases ▼ |
| ☐ MasterCard BusinessCard Debit Card | Do not use for Internet purchases ▼ |
| ☐ MasterCard Corporate Card | Do not use for Internet purchases ▼ |
| ☐ MasterCard Corporate Purchasing Card | Do not use for Internet purchases ▼ |

Visa

| | |
|---|---|
| ☐ Visa Classic Card | Do not use for Internet purchases ▼ |
| ☐ Visa Gold Card | Do not use for Internet purchases ▼ |
| ☐ Visa Platinum Card | Do not use for Internet purchases ▼ |
| ☐ Visa Titanium Card | Do not use for Internet purchases ▼ |
| ☐ Visa Business Card | Do not use for Internet purchases ▼ |
| ☐ Visa Purchasing Card | Do not use for Internet purchases ▼ |
| ☐ Visa Corporate Card | Do not use for Internet purchases ▼ |
| ☐ Visa Corporate Card | Do not use for Internet purchases ▼ |
| ☐ Visa Corporate Card | Do not use for Internet purchases ▼ |
| ☐ Visa Cash Card | Do not use for Internet purchases ▼ |
| ☐ NextCard Visa | Do not use for Internet purchases ▼ |

Other

| | |
|---|---|
| Digital Gift Certificate | Do not use for Internet purchases ▼ |
| Telephone Number/Bill | Do not use for Internet purchases ▼ |
| Internet Service Provider | Do not use for Internet purchases ▼ |
| e-Check | Do not use for Internet purchases ▼ |
| Other | Do not use for Internet purchases ▼ |

☐ Don't own any payment cards
☐ Don't have a preferred online card

FIG. 1f

What is the main reason you selected the payment product you did in making the this transaction online?

[--Select--  ▼]

If you use a payment product exclusively for online purchasing, what is your main reason? (if you don't use a payment product exclusively for online purchasing, please select the appropriate option.)

[--Select--  ▼]

If you have ever had an online merchant refuse an order, what was the reason? (If you have never had an online merchant refuse an order, please select the appropriate option.)

[--Select--  ▼]

BizRate.com will follow-up.

We will email you to find out if your order was delivered on time and if you were satisfied. In accordance with our privacy policy, we won't sell this information or give it to anyone without your consent.

Email Address [_____] (Required)

Your Comments

Write a review of Online Merchant for the customer review section on BizRate.com. Help millions of shoppers learn what works, what doesn't work and what your overall experience with Online Merchant has been.

[text area]

☐ Please forward my email address to Online Merchant so they can address my comments.

☐ You may use and release my review anonymously for other shoppers to see.

☐ Yes! Please tell me how I can save up to 25% on my online purchases!

☐ Yes! I'd like to join the BizRate.com Online Research Team and have a chance to win gifts and prizes for participating in Web-based research studies.

FIG. 1g

200 EVALUATION FOR: Online Merchant

Thank you for taking the time to provide online shoppers with valuable feedback about the delivery of your online purchase.
Fill out the following short survey and click submit for your chance to win $5000.

Has your order been delivered?

| --Select-- | ▼ |

How satisfied are you with the product and Online Merchant's service?
Using the ten-point scale below, please tell us your satisfaction level for each of the following:

|  | How Satisfied Were You? | | | | | | | | | | |
|---|---|---|---|---|---|---|---|---|---|---|---|
|  | Not at all | | A Little | | Some- what | | Quite a Bit | | Highly | | |
|  | 1 | 2 | 3 | 4 | 5 | 6 | 7 | 8 | 9 | 10 | NA |
| 202 On-Time Delivery<br>Consider: Expected vs. actual delivery date | O | O | O | O | O | O | O | O | Ø | O | O |
| 204 Product Representation<br>Consider: Product description/depiction vs. what ou got | O | O | O | O | O | O | O | O | Ø | O | O |
| Level & Quality of Customer Support<br>Consider: Information quantity, quality & relevence | O | O | O | O | O | O | O | Ø | O | O | O |
| 208 Posted Privacy Policies<br>Consider: Online merchant's efforts to inform you | O | O | O | O | O | O | O | Ø | O | O | O |
| 210 Product Shipping & Handling<br>Consider: Appropriateness & condition of packaging | O | O | O | O | O | O | Ø | O | O | O | O |

206 (bracket for Level & Quality row)

212

For this order only, did you contact Online Merchant's customer support for any reason (by phone or email)?
○ Yes
○ No

FIG. 2a

Taking into account the many components of this online purchase, please indicate your overall satisfaction level with Online Merchant using the ten-point scale below:

| | Satisfaction Level | | | | | | | | | | |
|---|---|---|---|---|---|---|---|---|---|---|---|
| | Not at all | | A Little | | Some-what | | Quite a Bit | | Highly | | |
| | 1 | 2 | 3 | 4 | 5 | 6 | 7 | 8 | 9 | 10 | NA |
| Overall Shopping Experience<br>Consider: All components of this online purchase | ○ | ○ | ○ | ○ | ○ | ○ | ○ | ○ | ○ | ○ | ○ |

The next time you buy such products, what is the likelilood that you will shop from Online Merchant again?

[ --Select-- ▼ ]

Your Comments
Write a review of Online Merchant for the customer review section on BizRate.com. Help millions of shoppers learn what works, what doesn't work, and what your overall experience with Online Merchant has been.

[text area]

☐ Please forward my e-mail address to Online Merchant so they can address my comments.

Comments about Bizrate.com

[text area]

☐ You may use and release my review anonymously for other shoppers to see.

Thank you for your time!

You've just made the Internet a safer, better place to shop. Remember to always start at BizRate.com before you shop online!
Please click below to submit your survey.

[Submit Survey]

FIG. 2b

BizRate.com Customer Analysis Report
--Sample--

Trends: Merchant Performance

| | Merchant Attributes | Mar-99 | Apr-99 | Mar-99 | Merchant Performance (On a scale from 1 to 10) Jun-99 | Jul-99 | Aug-99 | Sep-99 | Oct-99 | Nov-99 | Dec-99 | Jan-00 | Feb-00 |
|---|---|---|---|---|---|---|---|---|---|---|---|---|---|
| Point-of-Sale | Ease of Ordering | 8.5 | 8.4 | 8.5 | 8.6 | | | | | | | | |
| | Product Selection | 8.7 | 8.5 | 8.7 | 8.4 | | | | | | | | |
| | Product Information | 8.2 | 8.0 | 8.0 | 8.1 | | | | | | | | |
| | Product Prices | 7.8 | 8.0 | 8.0 | 8.2 | | | | | | | | |
| | Web Site Navigation & Looks | 8.1 | 8.3 | 8.4 | 8.2 | | | | | | | | |
| Fulfillment | On-Time Delivery | 8.1 | 8.2 | 8.2 | 7.9 | | | | | | | | |
| | Product Representation | 8.7 | 8.9 | 8.9 | 8.6 | | | | | | | | |
| | Level & Quality of Customer Support | 8.1 | 7.9 | 7.6 | 7.9 | | | | | | | | |
| | Posted Privacy Policies | 8.2 | 8.3 | 8.2 | 8.5 | | | | | | | | |
| | Product Shipping & Handling | 8.8 | 8.9 | 8.7 | 8.7 | | | | | | | | |

FIG. 5a

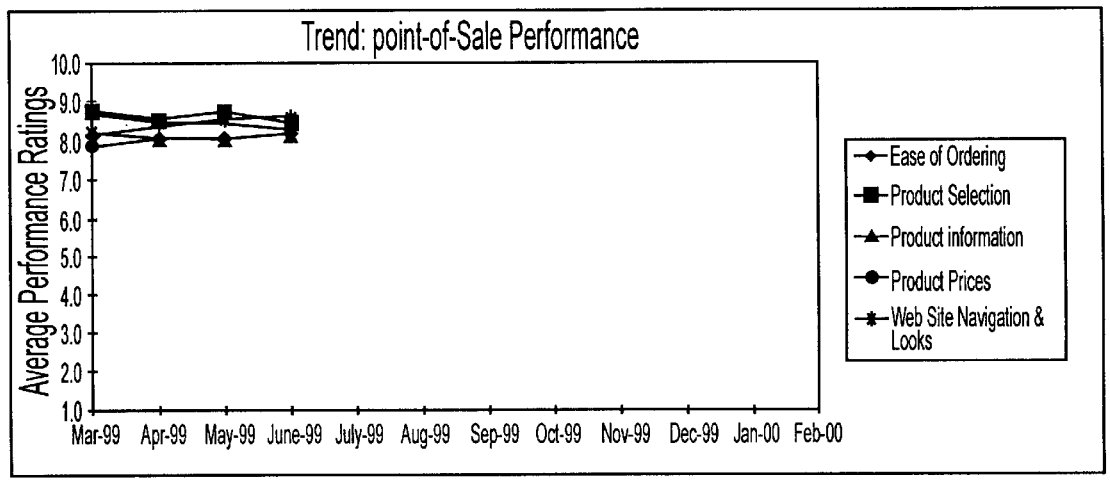

FIG. 5b

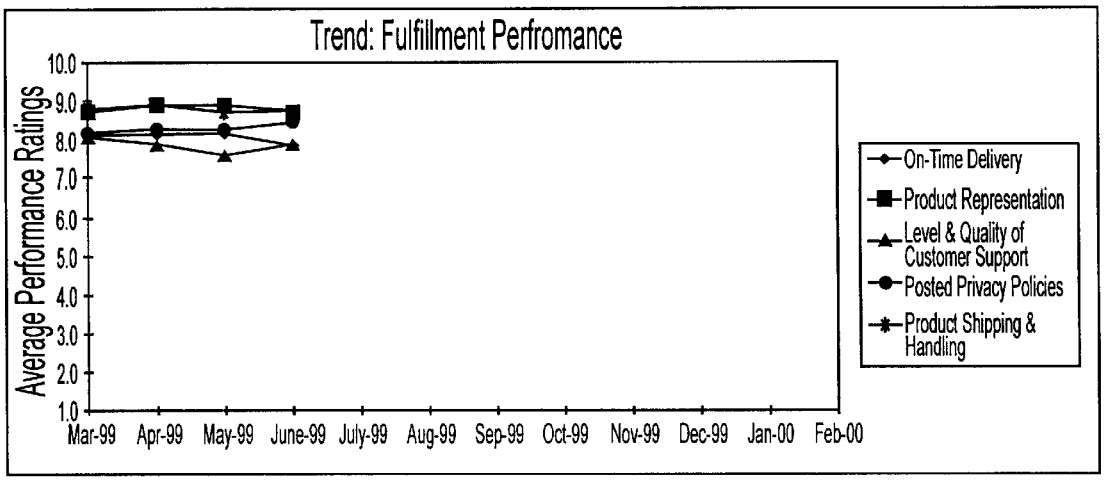

FIG. 5c

Trends: Merchant Performance
The graphs above show your organization's average performance ratings for the five Point-of-Sale and five Fulfillment merchant attributes. The graphs will enable your organization to closely monitor your performance trends.

| Merchant Performance Summary | |
|---|---|
| Merchant Attributes | Average Performance |
| Point-of-Sale | |
| Ease of Ordering | 8.6 |
| Product Selection | 8.4 |
| Product Information | 8.1 |
| Product Prices | 8.2 |
| Web Site Navigation & Looks | 8.2 |
| Fulfillment | |
| On-Time Delivery | 7.9 |
| Product Representation | 8.7 |
| Level & Quality of Customer Support | 7.9 |
| Posted Privacy Policies | 8.5 |
| Product Shipping & Handling | 8.7 |

Performance Averages are on a scale from 1 to 10 with:

1 & 2 = Very Low Satisfaction
3 & 4 = Low Satisfaction
5 & 6 = Moderate Satisfaction
7 & 8 = High Satisfaction
9 & 10 = Very High Satisfaction

FIG. 5d

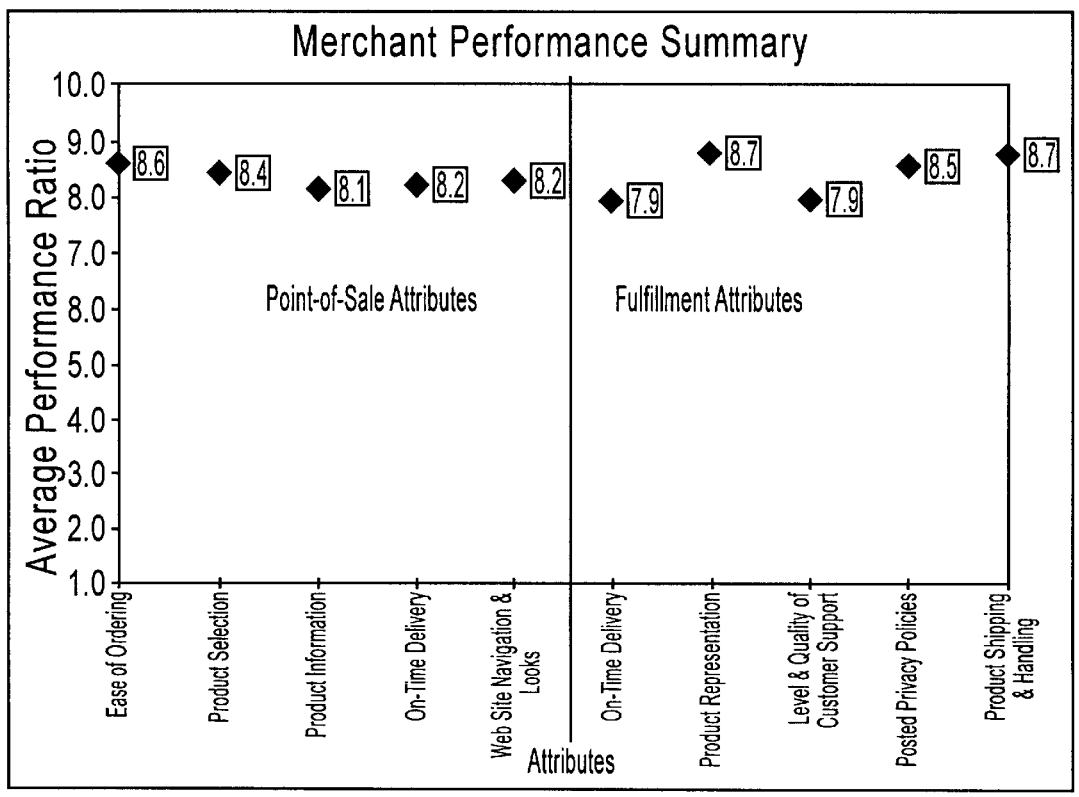

Merchant Performance Summary
Average performance ratings of the five Point-of-Sale and Five Fulfillment summarized above.

FIG. 5e

Performance
Product Prices

| Response | Count | % | Cum % |
|---|---|---|---|
| Very Low Satisfaction | 8 | 1.1% | 1.1% |
| Low Satisfaction | 17 | 2.4% | 3.5% |
| Moderate Satisfaction | 83 | 11.7% | 15.2% |
| High Satisfaction | 252 | 35.4% | 50.6% |
| Very High Satisfaction | 351 | 49.4% | 100.0% |
| Responses | 711 | 100.0% | 100.0% |
| (BLANK) | 25 | | |
| Total | 738 | | |

| 1 | (P,t)<sub>1,0</sub> | | (P,t)<sub>1,1</sub> | | (P,t)<sub>1,2</sub> | | · · · | (P,t)<sub>1,k1</sub> | |
|---|---|---|---|---|---|---|---|---|---|
| 0 | $P_{0,0}$ | $t_{0,0}$ | $P_{0,1}$ | $t_{0,1}$ | $P_{0,2}$ | $t_{0,2}$ | | $P_{0,k0}$ | $t_{0,k0}$ |
| 1 | 0 | $t_{1,0}$ | $P_{1,1}$ | $t_{1,1}$ | $P_{1,2}$ | $t_{1,2}$ | · · · | $P_{1,k1}$ | $t_{1,k1}$ |
| 2 | 0 | $t_{2,0}$ | $P_{2,1}$ | $t_{2,1}$ | $P_{2,2}$ | $t_{2,2}$ | | $P_{2,k2}$ | $t_{2,k2}$ |
| ⋮ | | | | | | | | | | bizrate.com

Search | Find A Store | | Referral BONUS Rebates | home | help
| | Enter store name [GO] | | Stores with Special Offer
| | | | Join Now! Sign In Home > Computer Hardware & Software > PDAs Search Results — Searching for PDAs: Refine Your Product Search
- 70 Stores
- 4 Pages    Manufacturer: [3Com Corporation ▼]
Refine Search Preferences
Helpful Tips    Keyword: [ ]
  (optional)

Sort Results By:
[Overall Rating ▼] (GO)      (SUBMIT)

| Rating ▽ | Store Name ▼ | Special Offers | Activity Level ▼ | OnTime ▼ | |
|---|---|---|---|---|---|
| ☆☆☆☆ | Outpost.com | [$0$] 3% rebate | ● | 98 | GO SHOP |
| ☆☆☆☆ | Mercata, Inc. | [$0$] 5% rebate | ● | 98 | GO SHOP |
| ☆☆☆☆ | eCOST.com | | ● | 98 | GO SHOP |
| ☆☆☆☆ | PC Connection Online Superstore | [$0$] 3% rebate | ● | 98 | GO SHOP |
| ☆☆☆☆ | Multiwave Direct | | ● | 98 | GO SHOP |
| ☆☆☆☆ | CDW Computer Centers | | ● | 97 | GO SHOP |
| ☆☆☆☆ | Computers4SURE.com | | ● | 98 | GO SHOP |
| ☆☆☆☆ | NECX Computer Marketspace | | ● | 97 | GO SHOP |
| ☆☆☆☆ | IC-Direct | | ● | 98 | GO SHOP |
| ☆☆☆☆ | AVLogic | | ● | 97 | GO SHOP |
| ☆☆☆☆ | Solutions4sure.com | | ● | 98 | GO SHOP |
| ☆☆☆☆ | Insight | | ● | 98 | GO SHOP |
| ☆☆☆☆ | Neutron Inc. | | ● | 98 | GO SHOP |
| ☆☆☆☆ | CMPExpress.com | | ● | 98 | GO SHOP |
| ☆☆☆☆ | Combined Digital, Inc. | | ● | 97 | GO SHOP |
| ☆☆☆☆ | MobilizedNow, Inc. | | ● | 99 | GO SHOP |
| ☆☆☆☆ | Ascent Technology Ltd | | ● | 96 | GO SHOP |
| ☆☆☆☆ | buy.com | | ● | 97 | GO SHOP |
| ☆☆☆☆ | Egghead.com | | ● | 97 | GO SHOP |
| ☆☆☆☆ | Office Depot | | ● | 98 | GO SHOP |

Top BizRater PDA:

Palm Vx - 8 MB

3COM PALM IIIX 4 MB

Palm V 2 MB - Palm OS 3.0

Casio Cassiopeia E-105 32

Palm IIIE - - RAM 2 MB

HP JORNADA 430 16 MB

PSION Series 5MX Palmtop 6 MB

Palm VII - 2 MB -

HP JORNADA 420 8 MB

Compaq AERO 1530 16 ME

|1|2|3|4|      next >

Home | About BizRate.com | Contact Us | Press | Jobs | Merchants Only
BizRate.com is a registered trademark. Copyright 1996-2000.
All rights reserved. See legal notice.
See Our Privacy Policy

FIG. 18 bizrate.com

Search
| Categories ▼ | GO |

Find A Store
| Enter store name | GO | home | help
Stores with Special Offer
Join Now! Sign In

About BizRate.com - Store Rankings

We rate e-business.

- Who is BizRate.com?
- Ratings
- Privacy Policy
- Press
- Jobs
- Merchant Info
- Research Solutions
- Contact Us
- Legal Notice

bizrate.com
customer certified

If you wanted to identify the best store from which to buy, how would you decide? You could visit one store after another. You could even stop in a few and browse around. But after all that, you've spent a lot of time and still may be undecided. In the end, the best way to decide would be to ask people who have brought at these stores before you. There is no substitute for experience – that is the foundation of our ratings at BizRate.com.

BizRate.com rates e-businesses in the best way possible – by asking tens of thousands of consumers to tell us about their actual shopping experiences each day. We accomplish this by inviting every purchasing customer at participating online stores to take part in a survey, immediately after buying, to give us feedback on their experience. We then follow up after the expected order delivery date to see if the delivery arrived on time and met expeditions. To see a demonstration of how the surveys work, click here.

What do you think of this online store?
Please take a moment to fill out our independent survey about your online shopping experience.
You could win up to $5,000⁰⁰ instantly.
bizrate.com
We rate e-business.
Click Here The BizRate.com survey asks consumers to rate the performance of the online store from where they just made their purchase on the BizRate.com. Ten Dimensions of Service. This information is then compiled and appears in the online store's Performance Report.

BizRate.com Ten Dimensions of Service

- Ease of Ordering - Convenience and speed of ordering
- Product Selection - Breadth and depth of products offered
- Product Information - Information quantity, quality & relevance
- Product Prices - Prices relative to similar online stores
- Web Site Navigation & Looks - Speed of site, quality of layout and the presence of broken links, pictures, or images
- On-Time Delivery - Expected versus actual delivery date
- Product Representation - Product description or depiction versus what was actually received
- Level & Quality of Customer Support - Status updates and Handling of complaint or question
- Posted Privacy Policies - Efforts to inform you of policies
- Product Shipping & Handling - Appropriateness & condition of packaging your delivery In order to provide the most complete listing of online stores possible, we also include stores that don't participate in the BizRate.com program. This is how we distinguish among them.

FIG. 19a

Customer Certified Ratings (gold stars)

Customer Certified online stores have performance ratings presented as gold stars. They have agreed to allow BizRate.com to continuously survey every customer who makes a purchase on their Web site.

Member Ratings (silver stars)

Online stores with Member Rated online stores do not participate in the free BizRate.com Customer Certification Program and have ratings presented as silver stars. The evaluation of these online stores has been provided by members of BizRate.com's Online Research Panel of 100,000+ actual online buyers.

In Process

In Process online stores are similar to Member Rated online stores in that they are not participating in BizRate.com's free Customer Certification Program and do not allow their customers to continuously and openly rate their performance. Performance ratings for these online stores are not available at this time. We are in the process of collecting evaluations of these stores from members of BizRate.com's Online Research Panel of 100,000+ actual online buyers.

We compile all the feedback we receive from consumers like you into an online store Performance Report for each e-business that we rate.

Contact us for more information about BizRate.com's products and services.

Home | About BizRate.com | Contact Us | Press | Jobs | Merchants Only
BizRate.com is a registered trademark. Copyright 1996-2000.
All rights reserved. See legal notice.
See Our Privacy Policy

FIG. 19b

FIG. 20 bizrate.com

Search
[Categories ▼] [GO]

Find A Store
[Enter store name] [GO]

Referral BONUS Rebates home | help
Stores with Special Offer
Join Now! Sign In

- About Rebates
- See Special Offers
- BizRater Account Info
- Edit Account Info
- Search Preference
- Refer a Friend
- Shopping Email
- Legal
- Help & FAQs

*Refer a Friend - Earn bonus Rebates*

**Grow the BizRate.com Community
and grow your BizRater Rebates!**

Act Now! Deadline to refer new members is March 31, 2000.

As a member, when your friends join BizRate.com and tell us that you referred them, we'll pay you a 10% bonus rebate based on the rebates they earn. And, when your friends refer their other friends who join you'll earn a 5% bonus on their rebates too! Finally, when your friend's friends refer other friends who join, you'll even get an additional bonus of 2.5% on those rebates. (Details)

|  | your friends | friend's friends | friend's friend's friends |
|---|---|---|---|
| you | | | |

10% + 5% + 2.5% = $$$

(JOIN NOW!)

Best of all, these bonus rebates never come out of your friend's pocket. It's your reward from BizRate.com—our way of thanking you for helping the BizRate.com Community to grow.

Simply copy and paste the text below into your email program and personalize a message for your friends. Then, send to as many friends as you like.

```
I found this new site that's perfect for people
who shop online.  Go to BizRate.com. You can find
the best stores that sell whatever you're looking
for, and they even give you  rebates at many of
our favorite stores.

Here's the address:
http://www.bizrate.com/reg/signup.xpml?referrer=
Go there and sign up (it's free!), and they'll
give up to 25% cash back when you buy
something online. For helping to get more people
to join the BizRate.com  community, BizRate.com
gives out bonus rebates.  So once you sign up, you
can tell others and get the same deal.  It's like
getting free money!
```

Remind your friends to visit the URL in the email you send or to copy and paste the URI into their browsers. That way you'll get credit for the referral.

Once they join, you'll get bonus rebates based on a percentage of the rebates they earn.

Bonus Rebates are available through March 31, 2000.

FIG. 21

SYSTEM AND METHOD FOR DATA COLLECTION, EVALUATION, INFORMATION GENERATION, AND PRESENTATION

BACKGROUND OF THE INVENTION

The present invention relates to a system and method for data collection, evaluation, information generation, and presentation. More particularly the present invention relates to a system for collecting, evaluating, and presenting data, and generating information relating to electronic commerce. The system and methods of the present invention include one or more of the following: a module for stabilizing small or noisy samples of data; alarm modules that alert an event handler when data values cross specified thresholds; predictor modules that use recent historical data along with an estimated and/or available saturation population function as the basis for a differential equation that defines the growth of the population to a maximum attainable level; and a dynamic icon that conveys to users of a system levels of predefined activity occurring on the system.

The availability of relatively low cost, powerful computer systems and the development of online communication systems and networks—principally the Internet and its protocols, and the availability of low-cost consumer computer systems—have fueled the growth of e-commerce. As used herein "e-commerce" means commercial transactions for goods or services, particularly wholesale or retail sales of products or services, or bartered exchange of the foregoing, over global computer networks, such as the Internet, or any smaller computer network that unites users and suppliers of goods or services.

The rapid growth of e-commerce makes the need for such guidance even more compelling. In a study by the assignee of the present invention, it was found that over the 12-month period ending June 1999, total retail e-commerce sales tripled from $2.67 to $7.94 billion. (Source: $2^{ND}$ QTR: 1999 *Consumer Online Report for Total Retail e-commerce*, published by BizRate.com, 1999).

The Internet has been swiftly facilitating the growth of local and regional markets into national and international markets. This market expansion provides consumers with many new advantages and opportunities including better product pricing, product selection, product quality, and customer service. The market expansion also creates new advantages and opportunities for businesses, including a broader base of consumers and suppliers. With the advantages and opportunities come new challenges.

The success of a business engaged in e-commerce may depend on how well it understands the dynamics and parameters of the e-commerce marketplace, and how well the business understands its status in such marketplace. Unfortunately, traditional models for evaluating the performance of a business are not well suited or optimized for evaluating the performances of businesses engaged in e-commerce. The nature of e-commerce and the manner in which it is conducted demand new and improved systems and methods for evaluating business performance. Consumers also need guidance so that they may understand their options and make the best decisions when doing business online.

From the consumer perspective, chief among the challenges is finding among the myriad of online businesses the merchants who offer the category of products sought at the best pricing, product selection, product quality, reputation, etc. The rating of a merchant relative to such variables may change rapidly in response to marketplace conditions. For example, marketplace competition may drive competitors to change their prices daily. Product availability may also change on as frequent a basis. For such reasons, consumers need a mechanism that helps them quickly locate the best merchants for their needs based on the most current and accurate data and information available.

Merchants also face new challenges in the online marketplace. They must be able to reach consumers and communicate to consumers the value they can deliver. To do this, they must understand the competition, and what drives consumers to make purchases. They must monitor their own prices relative to competitors' prices on a frequent basis to remain competitive. They must also understand what level of satisfaction or dissatisfaction consumers have from transactions with themselves and competitors, as well as the bases of satisfaction or dissatisfaction. For such reasons, merchants need a mechanism that helps them quickly obtain the most current and accurate information.

Traditionally, marketing surveys have been employed to determine how well a business rates in the eyes of consumers. Direct feedback from consumers provides important information. In traditional forms of commerce, consumer satisfaction surveys have been long used to gather direct feedback from consumers. (Traditional forms of commerce include in-store, telephonic, and mail order commerce.) The surveys help businesses understand what positive and negative things they are doing. With the proper understanding, the businesses may reinforce the positive things and correct the negative ones. The more accurate and current the survey results, the better a business can achieve its objectives.

Unfortunately, administering and processing consumer surveys, even in traditional modes of commerce, has been problematic in various respects, for example:

How do you get consumers to fill out such surveys?

Is the sample size of responses large enough to produce accurate reports?

How do you input and process the data?

Has the data been processed in a timely manner?

How are results to be timely reported to businesses?

What do the results mean to the business?

What steps should the business take in view of the results?

What has been the effect of any remedial action?

With respect to these questions, there are many problems. The surveys are typically presented to consumers as paper questionnaires for the consumers to manually fill in. Such surveys may be costly to construct and print. Once printed, they cannot be modified. Consumers generally dislike filling out survey questionnaires, and therefore it may be difficult or time consuming for the survey sponsor to gather enough completed survey questionnaires to constitute a statistically significant sample size. Often, the completed survey questionnaires must be returned by mail; even if a consumer has filled out the survey questionnaire, the consumer may not take the trouble of dropping it in the mailbox.

To overcome these kinds of problems, survey sponsors sometimes employ individuals to field survey responses from individuals. These individuals may be stationed in a store to verbally field answers to survey questions or they may telephone consumers after a transaction. The problem with using individuals to administer surveys is the cost of administering the survey and the intrusiveness of the process. The intrusiveness is such that consumers may be alienated from doing further business with a merchant. This is particularly a concern relative to telephone surveys. With intrusive survey methods, even if the consumer is inclined to answer questions by a survey taker, the consumer's answers may be skewed toward an unfavorable response, creating inaccurate results.

The processing of completed survey questionnaires has its own set of disadvantages. The completed survey questionnaires usually must be read by data entry personnel and manually input by them into a data processing system. This not only adds to the cost of administering a survey, but it also results in delays between the time surveys are taken and the time the results are processed.

In view of the inherent delays in administering surveys and inputting survey data, by the time a business receives a report of the results of a survey, the results may no longer be accurate. For example, consider a survey about price competitiveness: competitors may have dropped prices in the interval between the responses to a survey and the processing and reporting of information. During such an interval, a business could lose significant sales and revenues because they have not reacted contemporaneously to competitors' price changes. If there is a decline in consumer service ratings that is not corrected quickly because of the interval between survey responses and reporting of results, a business may also lose consumer goodwill, and consequently sales and revenues.

Another problem with traditional survey modes is that a business may have difficulty benefiting from the survey results. One reason is that, although a business can take remedial action in view of the results, to monitor the results of any remedial action requires a subsequent survey. There is a disincentive for a subsequent survey because of all the aforementioned disadvantages related to traditional modes of surveying such as cost, time required, etc. However, if the problems inherent in traditional forms of surveying could be overcome, subsequent surveys could be undertaken to determine the effectiveness of remedial action dictated by the initial survey.

In view of the disadvantages in traditional survey methodology, a few years ago the assignee of the present invention developed and implemented a novel system for providing timely and accurate reporting of information relating to the sales, marketing, consumer satisfaction, and other commercial activities of participating businesses. In the system, online buyers are non-intrusively invited to fill but a survey questionnaire immediately after completing a purchase at a participating merchant. The invitation is in the form of a banner on the order confirmation receipt from a participating merchant's website. If the buyer has clicked on the banner to accept the survey questionnaire, the buyer is hyper-linked to a questionnaire from a survey system server. The buyer completes the survey questionnaire and the survey data are electronically returned to a data processing system for processing and evaluating survey results. The same system can electronically report the processed results from a sample of survey questionnaires directly to participating or subscribing merchants.

Thus, the system of the assignee overcomes disadvantages in the art by providing a system that electronically gathers data and transmits it directly into the data processing system. Among the advantages of this system, it eliminates the need for manual entry of data on paper forms; the use of individuals to take and input survey data gathered from consumers; the delays that occur between data collection and input, and data input and processing; and the costs associated with such methodologies. While this system has begun to address many disadvantages of traditional modes of surveying, processing, and evaluating survey data, the dynamics of the e-commerce marketplace demand faster and more accurate data gathering, processing, evaluation and reporting of data and information.

The rate at which reports can be issued depends on how fast survey responses are returned and on the minimum sample size required. It is fundamental in statistical sciences that, when conventional modes of statistical analysis are employed, an inadequately small sample or a noisy sample will lead to inaccurate results. However, business and marketplace conditions may be changing faster than adequate sample sizes can be gathered for accurate results using conventional modes of statistical analysis and estimation theory. Such conventional modes include "moving window averages" (weighted and unweighted). Accordingly, businesses may be at risk if certain trends relating to the business or marketplace take shape before data is collected in sample sizes suitable for traditional modes of statistical analysis and estimation.

In view of the foregoing, there is a strong need for novel data processing systems that can discern trends and otherwise provide results based on limited or noisy data samples. Further in view of the foregoing, there is a substantial need for data gathering, processing and evaluation systems that quickly alert businesses to incipient trends in their business activities and marketplace so that appropriate action may be taken to protect and advance a business's well-being. There is also a need for systems that allow a business to predict growth rates and limits of variables relating to the business or marketplace.

SUMMARY OF THE INVENTION

The present invention relates to a system and method for data collection, information generation, evaluation, and presentation that overcomes the aforementioned problems in the prior art. More particularly the present invention relates to a system for collecting data, generating, evaluating, and presenting information relating to electronic commerce via the Internet. The system and methods of the present invention include one or more of the following: a module for stabilizing small or noisy samples of data; alarm modules that alert a handler when data values are anomalous or cross specified thresholds; predictor modules that use recent historical data along with an estimated and/or available saturation population function as the basis for a differential equation that predicts the future growth of the population to a maximum attainable level; and a dynamic measurement indicator that conveys to users of a system levels of predefined and ongoing activity occurring on another'system. The fields of the invention include e-commerce; information retrieval/analysis; and planning and control. Before the present invention, the period for gathering sufficient quantities of data to resolve a trend often exceeded the time required for a merchant to begin suffering lost sales or other harms because of an undetected incipient trend.

In one novel embodiment, the present invention provides a system for stabilizing data comprising one or more databases containing data for processing; a plurality of processing modules in communication with each other and/or the one or more databases, each processing module performing a predefined operation on data retrieved from a database or received from a processing module, at least one processing module being a data stabilizer processing module; one or more databases in communication with a processing module that outputs data that has passed through the data stabilizer processing module, the one or more databases storing the stabilized data received from the processing module; and a presentation server in communication with a database with the stabilized data for presenting selected items of the data. The presentation server may be accessible to a plurality of remote computer systems, such as consumer and merchant computer systems, via a network, such as the Internet. The system may include a data capture server capable of receiving data from one or more data sources over the Internet, the data capture server providing data to the one or more databases in communication with a data stabilizer processing module. The stabilized data on the presentation server may be accessible to a plurality of remote computer systems via the Internet. The system may also include a survey server that serves a survey questionnaire to a data source comprising remote computer systems so that a user of a remote computer system can complete the survey questionnaire, a completed survey questionnaire containing data being returnable to the data capture server over the Internet. In the system, the remote computer systems may be plurality of consumer computer systems and the completed survey questionnaires include data relating to an online transaction between a consumer and a merchant. The presentation server may be accessible to a merchant and/or a consumer computer system. In the system, the presentation server may be accessible to a plurality of remote computer systems via a network, wherein the presentation server serves remote computer systems stabilized data relating to online transactions between consumers and merchants, the ratings being based on data collected in the data capture server from data sources comprising a plurality of consumer computer systems.

In related embodiments, data input to the data stabilizer processing module may be processed using an adaptation of an Extended Kalman Filter. The data stabilizer processing module may use the equation $\hat{\underline{x}}_i = \hat{\underline{x}}_{i-1} + K_i[\tilde{A}_i - A_{i/i-1}]$ with $\hat{\underline{x}}_i = [c_{0,i}, c_{1,i}, c_{2,i}]^T$ and $$x_{i+1} = \begin{bmatrix} 1 & \Delta t_i & \Delta t_i^2 \\ 0 & 1 & 2\Delta t_i \\ 0 & 0 & 1 \end{bmatrix} x_i$$

stabilize values of data. One or more observations may be related to state by $A_{i/i-1} = [0\ 0\ 1]\hat{x}_{i-1}$. In the system, the Extended Kalman Filter may be adapted for stabilizing data collected from consumer survey questionnaires relating to an online transaction between consumers and merchants. In the system, the data stabilizer module may be in communication with another processing module that receives and processes data before the stabilized data is passed to the presentation server.

In another embodiment, the present invention provides a presentation server that includes web pages containing e-commerce data or information that has been derived from a data stabilizer processing module, the web pages being accessible to a plurality of remote merchant or consumer systems over a computer network, such as the Internet. A web page may include evaluation information about merchant performance, the information being derived from data processed by the data stabilizer processing module. Data input to the data stabilizer processing module is processed using an adaptation of an Extended Kalman Filter.

In another novel embodiment, the present invention provides a method of stabilizing data values comprising transferring data relating to e-commerce to a data stabilizer processing module; stabilizing the transferred data; and presenting the data via a presentation server. The stabilized data on the presentation server may be made accessible to a plurality of remote computer systems, such as merchants and consumers, via a network, such as the Internet. The method may further include the step of capturing the data in a data capture server and then transferring captured data to the data stabilizer processing module. The captured data may come from survey questionnaires, such as survey questionnaires are completed by consumers and delivered to a data capture server over the Internet. In the method, the data may include a value comprising a mean value of an attribute on a survey questionnaire, the mean being determined based on a plurality of transactions between a consumer and merchant over a defined interval. In the method, the data stabilizer processing module may use the equation $\hat{\underline{x}}_i = \hat{\underline{x}}_{i-1} + K_i[\tilde{A}_i - A_{i/i-1}]$ with $\hat{\underline{x}}_i = [c_{0,i}, c_{1,i}, c_{2,i}]^T$ and $$x_{i+1} = \begin{bmatrix} 1 & \Delta t_i & \Delta t_i^2 \\ 0 & 1 & 2\Delta t_i \\ 0 & 0 & 1 \end{bmatrix} x_i$$

to stabilize values of data. One or more observations may be related to state by $A_{i/i-1} = [0\ 0\ 1]\hat{x}_{i-1}$.

In another novel embodiment, the present invention provides a method of serving stabilized data or information relating to e-commerce comprising providing a presentation server that includes web pages containing data or information relating to e-commerce that has been derived from a data stabilizer processing module, the web pages being accessible to a plurality of remote sellers and/or buyers computer systems over a computer network such as the Internet. Web pages may include evaluation information about a seller's performance, the information being derived from data processed by the data stabilizer processing module. In the method, data input to the data stabilizer processing module may be processed using an adaptation of an Extended Kalman Filter. The data stabilizer processing module uses the equation $\hat{\underline{x}}_i = \hat{\underline{x}}_{i-1} + K_i[\tilde{A}_i - A_{i/i-1}]$ with $\hat{\underline{x}}_i = [c_{0,i}, c_{1,i}, c_{2,i}]^T$ and $$x_{i+1} = \begin{bmatrix} 1 & \Delta t_i & \Delta t_i^2 \\ 0 & 1 & 2\Delta t_i \\ 0 & 0 & 1 \end{bmatrix} x_i$$

to stabilize values of data. One or more observations are related to state by $A_{i/i-1} = [0\ 0\ 1]\hat{x}_{1-1}$. In the method, the data stabilizer may be adapted for stabilizing data collected from consumer survey questionnaires relating to an online transaction between consumer-buyers and merchant-sellers. The data stabilizer may be adapted for stabilizing data collected from consumer survey questionnaires relating to an online transaction between consumers and merchants. Data input to the data stabilizer processing modules may be processed using an adaptation of an Extended Kalman Filter. The Extended Kalman Filter may be adapted for stabilizing data collected from consumer survey questionnaires relating to an online transaction between consumers and merchants.

The foregoing enumeration of embodiments has been for illustrative purposes only. Other embodiments, combinations of embodiments and combinations of features are also within the scope and spirit of the teachings described herein, as will be apparent to persons skilled in the art from these teachings.

BRIEF DESCRIPTION OF THE DRAWINGS

FIGS. 1(*a–g*) is an example of a possible consumer survey questionnaire for rating an online merchant and collecting demographic information about a consumer.

FIGS. 2(a–b) is another example of a possible consumer survey questionnaire for rating an online merchant and collecting demographic information about a consumer.

FIGS. 5a–e show means of presenting certain kinds of information processed from data collected from an exemplary consumer survey questionnaire, the information being presented in tabular and graphical formats.

FIG. 18 is an example web page from the infomediary website of FIG. 16 showing features of the present invention.

FIGS. 19a–b are an example web page from the infomediary site of FIG. 16 describing certain features in accordance with the present invention.

FIG. 20 is an example third party web page that is linked to the infomediary web page of FIG. 18, which is included to illustrate features of the present invention. (The applicant for patent claims no rights in the content of the third party web page shown, with all rights to such content remaining with the owner of that page.)

FIG. 21 is an example web page from the infomediary website of FIG. 16 showing features of the present invention.

DETAILED DESCRIPTION OF THE INVENTION

Figure 3:
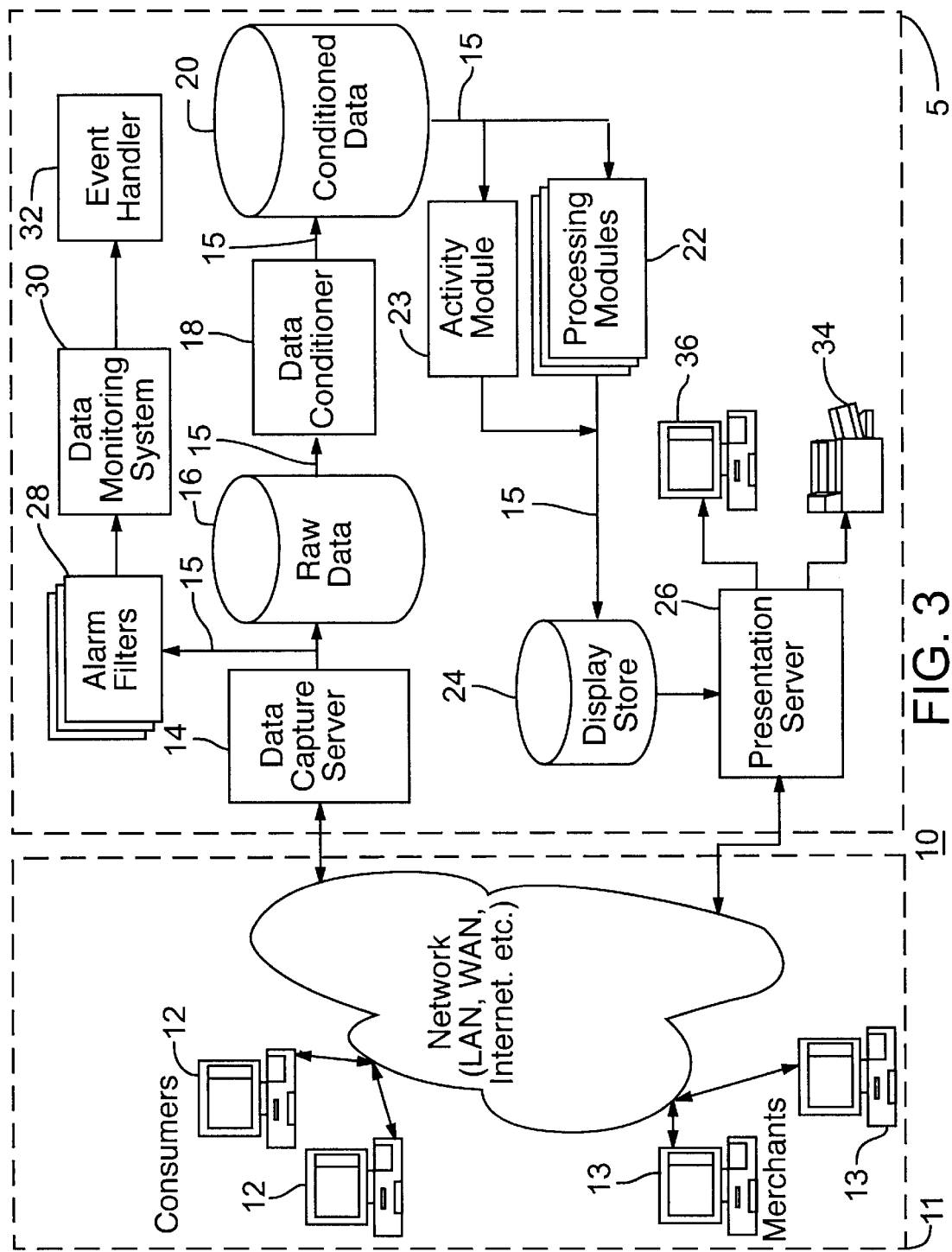
FIG. 3 is a schema of a system for processing and evaluating data relating to e-commerce, in accordance with one or more aspects of the present invention.

The present invention is a novel system and method for processing and evaluating data, and generating information relating to networked information retrieval and analysis, planning and control; and particularly e-commerce. The system preferably uses data gathered from or about transactions that occur online. The data may be gathered from any number of sources. It may be directly gathered from providers of goods or services, e.g., merchants, and users of goods or services, e.g., consumers, or other participants in an online transaction. The data may also be gathered from third-party suppliers of previously collected data. The data may be evaluated with respect to transactions with particular merchants a group of merchants, a group of consumers, or with respect to one or more categories of trade based on data gathered from one or more merchants, consumers, or third-party data sources in one or more trade categories.

In addition to evaluation of merchants and any other suppliers of goods and services, and trade categories, the present invention also contemplates evaluations of specific products and services. The principles of the present invention are equally applicable to such evaluations. Products and services may be evaluated based on defined attributes. For example, defined attributes could include: satisfaction with product quality, price, durability, longevity, safety, warranty, customer service; ease of assembly, use, maintenance or repair; cost of operation or repair; upgradability; compatibility, etc. Consumer survey questionnaires served at time of purchase or following a purchase could be used to collect attribute data. In addition, the data could be provided by expert non-consumers such as expert evaluators, as well as other conventional means.

The present invention also contemplates that an intermediary data source could collect data about merchants or products. An intermediary would be a party that is not the manufacturer or seller of the thing being evaluated. For example, an intermediary website could allow evaluators, such as consumers, to complete questionnaires for merchants, products, or services they wish to rate. The questionnaires could be provided on web pages served to consumers by the intermediary's web server. The website could offer incentives to motivate consumers to complete surveys. The intermediary could supply or provide the completed survey questionnaire data to or for the data capture systems of the present invention, as described below.

To illustrate features of the present invention relevant to processing and evaluating data received from the foregoing possible sources, the present invention will be discussed in terms of a specific example. This example is based on online retail transactions between consumers and merchants for goods or services sold online. Persons skilled in the art will recognize that the principles of the present invention illustrated in the example can readily be adapted for other e-commerce applications involving sellers and buyers, including business to business transactions. Accordingly, the embodiments shown in FIGS. 1–15, and described herein, should not be construed as limiting the invention to the specific embodiments shown and described.

FIGS. 1(a–g) show one possible embodiment of an online survey questionnaire. In particular, the Figures show screen shots of a consumer survey questionnaire for a retail online transaction. The survey questionnaire may be accessed through a direct link or a framed linked on a merchant's web page that connects to the survey questionnaire host server. The consumer may be invited to fill out an online survey questionnaire following an online purchase, for example. The invitation may be conveniently included on the invoice or order confirmation web page or email.

The survey questionnaire 100 invites a consumer to rate a merchant relative to five attributes in ten dimensions (a 1–10 rating):

(1) Ease of Ordering 102;

This attribute relates to the convenience and speed of ordering from the merchant's website.

(2) Product Selection 104;

This attribute relates to the breadth of products that the merchant has available, keeping in mind the merchant's stated area of focus.

(3) Product Information 106;

This attribute relates to the quality, quantity, and relevance of information provided for making a purchase decision an informed one.

(4) Product Prices 108; and

This attribute considers product prices relative to the competition.

(5) Web Site Navigation & Looks 110.

This attribute relates to the overall layout/organization, movement around the site; missing/non-functional links; speed; and how appropriately graphics were used to enhance the shopping experience.

The survey questionnaire includes ten merchant rating fields 112 for each attribute. It also includes an "NA" (not applicable) field. A rating of 1–2 corresponds to "not at all" satisfied; 3–4, "a little" satisfied; 5–6 "somewhat" satisfied; 7–8 "quite a bit" satisfied; and 9–10 "highly" satisfied. Performance ratings are intended to give merchants an accurate and comprehensive understanding of how they are performing in the eyes of their consumers.

The collected survey questionnaire data from a survey questionnaire 100 is communicated to a data capture server 14 where the data is parsed, stored, and communicated to storage, processing modules, etc. described herein.

As shown in FIGS. 2(a–b), one or more post-purchase or "fulfillment" survey questionnaires 200 may be sent to a consumer that has filled out the survey questionnaire 100 and taken delivery of the purchased product at set intervals. The survey questionnaire may, for example, be sent by email and may include a hyperlink to a survey questionnaire server 14 where the collected survey questionnaire data is parsed, stored, and communicated to processing modules described herein. The consumer is asked to rate the merchant relative to five attributes in ten dimensions (1) On-Time Delivery 202;

This attribute relates to timeliness in the context of the promised delivery date.

(2) Product Representation 204;

This attribute relates to how well the online product description and depiction compared to what was actually delivered.

(3) Level & Quality of Consumer Support 206;

This attribute relates to how available and effective the merchant was in resolving any questions/complaints or problems that the consumer encountered. It also relates to any steps the merchant took to make sure that that the consumer was informed of order status and was happy with the transaction. (This is left blank if not applicable.)

(4) Posted Privacy Policies 208;

This attribute related to the security of credit card, personal, and transaction information.

(5) Product Shipping & Handling 210.

This attribute relates to the appropriateness and condition of product packaging.

As with the initial survey questionnaire 100, a merchant's fulfillment ratings may be expressed as a rating on a scale of 1–10 in fulfillment rating fields 212. A rating of 1–2 corresponds to "not at all" satisfied; 3–4, "a little" satisfied; 5–6 "somewhat" satisfied; 7–8 "quite a bit" satisfied; and 9–10 "highly" satisfied. Performance ratings are intended to give merchants an accurate and comprehensive understanding of how they performed in the eyes of their consumers.

It is to be understood that survey questionnaires 100 and 200 are merely exemplary. The survey questionnaires may include more or less attributes than are shown, may be based on other quantitative rating scales, may be based on qualitative ratings, etc. In other words, the survey questionnaires may be customized to evaluate any matter of interest. A survey questionnaire may also include fields relating to a consumer's particular demographics, preferences, dollar amounts spent, expectations, comments, etc. as shown in survey questionnaires 100 and 200. FIGS. 1b–1f and 2b are screen shots of survey questionnaires that query a consumer on such other information. The survey questionnaire may include data that is automatically attached to the survey questionnaire or otherwise associated with it by the merchant. This data may include an identifier for the purchased product (e.g., sku), product purchase price, number ordered, etc. The information can provide comprehensive measurement and bench marking of buyer demographics, transactional behaviors, and shopping preferences because it has been continuously collecting point-of-sale data from online consumers. The foregoing survey questionnaires and other potentially obtainable data through such survey questionnaires or other means are examples of data relating to an e-commerce transaction between a consumer and a merchant.

Among other things, the information that may be extracted from the data helps merchants increase buyer conversion and build loyalty through understanding buyer preferences; and provides companies with the ability to ask custom survey questions directly from any demographic or online shopping category by appending those questions to a survey questionnaire such as survey questionnaire 100 or 200. The data may also be developed into information that helps educate consumers about their options in the e-commerce marketplace.

After a consumer inputs data into a survey questionnaire, the captured data is entered into a survey data store and processed into information according to the methods described in more detail below.

As used herein, "data" means facts and beliefs about the real world; "information" is data that has been processed and formatted to support decision making.

FIG. 3 shows an overview of a through-flow system 10, according to the present invention. As used herein, the term "through-flow" generally means a system for gathering, transferring, processing, evaluating data, and/or generating information in a continual stream, as well as presenting and delivering such data and/or information in desired media to interested parties or other systems. The system 10 may be used to evaluate data from a variety of sources, as mentioned above. As indicated, for instance, it may receive and evaluate data from consumer satisfaction survey questionnaires, it may receive data from online merchants about their activities, or it may receive data from users or third parties who gather and provide data about electronic commerce.

Figure 4:
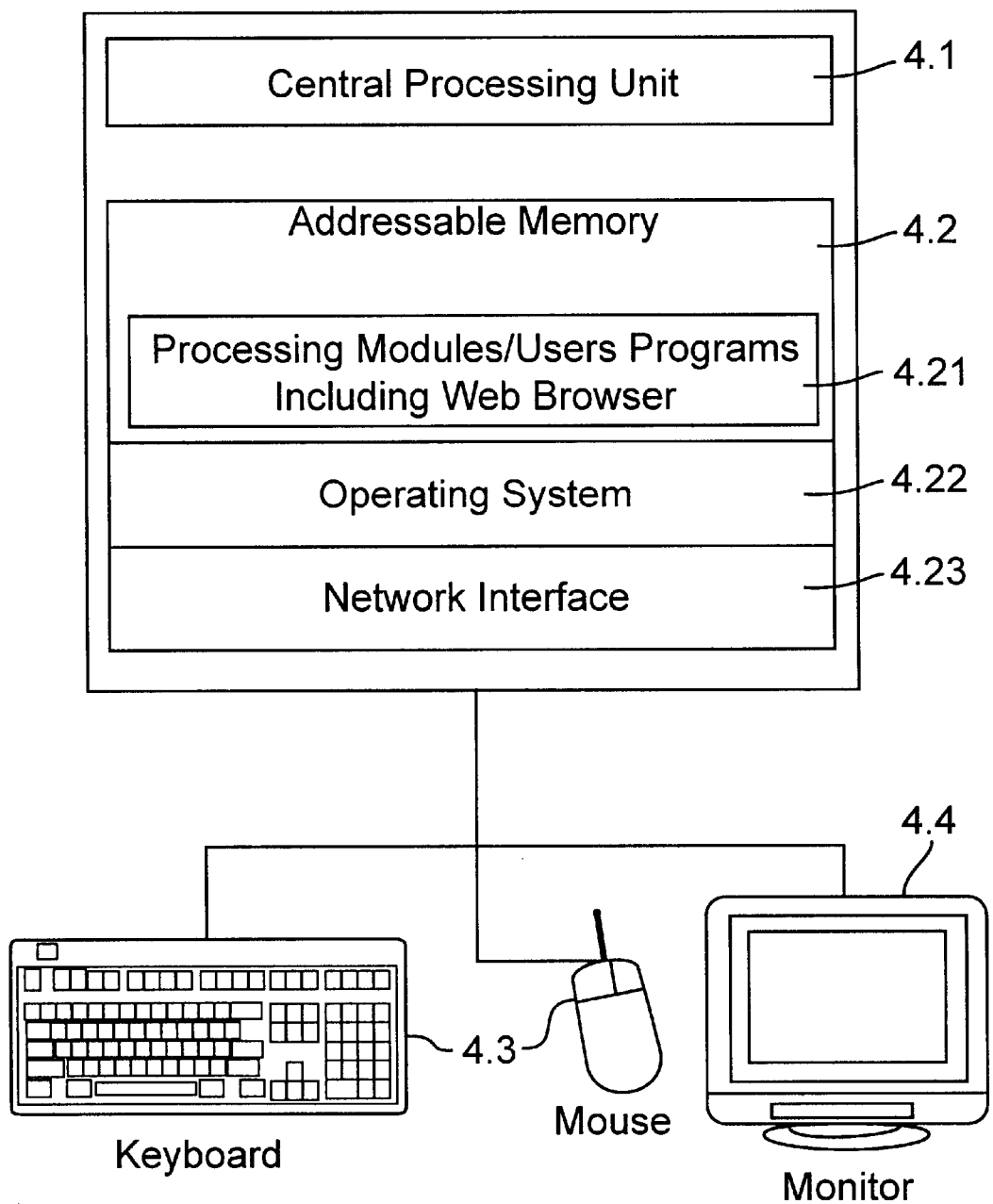
FIG. 4 is a block diagram that generally illustrates some features of a computer system that may be used in the present invention.

Generally, system 10 includes two or more networked computers. System 10 may be divided into a client or remote system 11 that is composed of one or more remote computer systems or terminals, e.g., 12 and 13, and a server or local system 5 composed of one or more computer systems with one or more sets of system components that are physically located together or networked together over some distance. System 5 is the side of system 10 that collects, processes, and evaluates data, and generates and presents the resulting information. System 11 is the side of system 10 that may provide data to system 5, or retrieve data from system 5. FIG. 4 illustrates features that would typically be found in a computer system of system 10. As used here in a "computer system" generally means a set of components that include one or more of the following: central processing unit ("CPU") 4.1; memory 4.2 and processing modules 22 or user programs 4.21, operating system 4.22 and network interface 4.23, and related I/O subsystems 4.3 and 4.4, including one or more of the following: disk drive, keyboard, mouse, display monitor, networking card, other subsystems well-known in the art, and related software applications, including web browsers, web servers, database, and/or communications software. It will be understood by persons skilled in the art, that the computer system, particularly computer systems in system 11 may also be in the form of a Personal Digital Assistant (PDA), a wireless computer system or device capable of network communications over the Internet or other network, or a computer terminal or Internet appliance capable of such network communications.

The local system 5 generally includes data capture server 14 that accepts data transfer from one or more data sources from remote system 11 computer systems or terminals. The data may also enter the data capture server by direct manual input or connection to storage medium such as a CD-ROM, disk drive, floppy drive, memory cards, ZIP drive cartridges, and the like. System 5 further includes database 16, data conditioner 18, database 20 for conditioned data, one or more data processing modules 22, a display store 24 for storing processed data, and a presentation server 26 for presenting data or information to an end-user. These, and other possible software components of through-flow system 10 described herein, reside on one or more hardware components providing addressable memory for a computer system of local system 5.

Computer systems of system 10 may execute a conventional operating system, including, but not limited to, Microsoft Corporation's Window (sm) 3.x, 95, 98, 2000, NT or DOS operating systems; Linux operating systems; Sun Microsystems' Unix Solaris operating systems; IBM's AIX Solaris operating systems; SGI's IRIX Solaris operating systems or other operating systems, including, but not limited to Window's CE, Palm OS, etc. for PDAs, cellular devices, web devices, or other computing devices.

The computer systems on system 10 may access and store data in any variety of data storage media, including, but not limited to, local hard drive, CD-ROM or other mass storage device, local area network servers, wide area network servers, Internet servers accessed via phone or cable, commercial consumer and business online services, distributed information sources such as any combination of the above, and local RAM if data is generated on demand or linked to other programs such as spreadsheet or database programs executing in RAM.

The components of computer systems of remote system 11 of the present invention may be disposed at various points of use including, but are not limited to, the home (such as on a stand-alone multi-media PC connected to an online service), office (such as on a workstation computer connected to a database on a WAN), kiosk used in-store, in hospitality services or training environments.

Turning to the specifics of system 10, the data that enters data capture 14 may relate to an online commercial transaction such as the type discussed above relative to survey questionnaires 100 and 200. Or it may be any other data type sought to be collected. For example, a consumer making an online purchase of goods from a merchant's website may be invited to fill out a consumer satisfaction survey questionnaire 100 or 200 following the transaction. The merchant's website may be located on a web server which may be part of or separate from system 10. In the case of online survey questionnaires, the survey questionnaire may be provided to the consumer as HTML, XML, Java Script, ActiveX, Applet, or other well-known mechanisms or formats for querying a local computer system through a web browser. (Other servers in system 10 may use the same mechanisms or formats for interfacing with other computers.) The survey questionnaire could be served by a web server that is part of local system 5. For example, the web server could reside on data capture server 14 or presentation server 26.

In local system 5, data capture server 14 serves as a web server for capturing the data that a consumer inputs into consumer satisfaction survey questionnaire 100. In general, a web server is a computer system that runs software that enables access by remote computer systems or terminals via the Internet or other network transport to allow presentation of information, data storage and transfer, and other transactions. Suitable web server software is well known and includes Apache Software Foundation's Apache Server web server; Netscape's FASTTRACK series web server, Microsoft Corporation's IIS, and Sun Microsystems' JAVA WEB SERVER.

The survey questionnaire may be presented to a consumer contemporaneously with a transaction or at some defined time after the transaction, or both. Email is another contemplated mode of communicating a survey questionnaire to a consumer. The email could contain a plain text based questionnaire that would be parsable by data capture server 14. Or the email might contain a link to an address that could serve the survey questionnaire in HTML, XML, Java Script, ActiveX, Applet, or other well-known mechanisms or formats for querying a consumer through a web browser.

In one possible embodiment, the invitation to fill out survey questionnaire 100 is found on the receipt page that a consumer receives confirming an online order. The invitation includes a hyperlink to a web server, e.g., data capture server 14, that presents survey questionnaire 100 via the browser of a consumer computer system 12.

It is also possible that the data collection process could be interactive. For example, the data received for certain fields may prompt a web server or other component of system 10 to query the consumer, or other provider of data, with respect to new fields that are dependent on data values sent to the system server 14. A survey taker might be asked to identify themselves as a male or female, with further survey questions being selected based on the answer.

The survey questionnaire could contain defined fields for data values. For example, survey questionnaire 100 could be designed to accept data values that represent a rating on a 1–10 scale of the consumer's perceptions about defined aspects of a transaction with a merchant, as described above relative to survey questionnaires 100 and 200.

In addition to consumer perceptions about aspects of a transaction, the survey questionnaires could seek any other kind of information in which a survey administrator may be interested. Such information may include demographic information about a consumer (e.g., age, profession, education, etc.); the consumer's perceptions about, and experiences with, online shopping (not limited to the transaction conducted); the consumer's interest in other lines of goods and services; whether the consumer wishes to participate in news groups, future offerings, etc. relating to the purchased product or any other subject matter.

The means for obtaining and collating survey data is well known in the art. For example, such techniques are disclosed in Peters, et al., U.S. Pat. No. 5,893,098 entitled "System And Method For Obtaining And Collating Survey Information From A Plurality Of Computer Users", the entire contents of which are hereby expressly incorporated by reference. For purposes of illustration, the following description shall be in terms of an online merchant rating survey questionnaire 100, as described above. The data shall be discussed in terms of a 1–10 rating entered relative to attributes 102–110 in rating fields 112.

After a consumer completes a survey questionnaire, the resulting survey data is fed to data capture server14 and logged into a server log. The log records the collected data and may assign an identifier or key value to the data. For example, the identifier could be an indicator of any number of things including the time of receipt, source (e.g., the particular merchant), etc. The logged data may then be parsed by a software program that assigns items of the raw data into predefined fields in a database 16. The parsing program may be created through standard program techniques that are known or within the skill of persons in the art. The parsing program would be designed to map data from the survey questionnaire to database records that are predefined.

Each record would be composed of one or more fields that correspond to the class of an item of data and/or the value of an item of data. Any field may be keyed to any one or more other fields. For example, in the case of survey questionnaire 100, the database would contain tables that include a field for each particular attribute 102–110. The numerical rating from each survey questionnaire, or average rating from a predefined group of survey questionnaires, would be listed as items under the relevant attribute 202–210 fields. Each table would typically include other fields such as survey identifier, time of receipt, source, etc.

Database 16, as well as any other database contemplated by this invention, including databases 20 and 24, may be based on any number of known database management systems (DBMS), including hierarchical databases, network databases, relational databases, and object oriented databases. Suitable DBMS are widely available and include Oracle, Sybase, Microsoft SQL Server, and DB2. One suitable database system is a relational database based on SQL language. A suitable SQL database would typically include a Data Definition Language (DDL) for creation of a new database and new objects within an existing database; a Data Manipulation Language (DML) for processing existing database objects; and a Data Control Language (DCL) for administering permissions and other security-related issues. The data processing is handled by a database engine database and can be accessed by various searching means, including Boolean logic evaluation, proximity calculations, and fuzzy logic evaluation. The databases of the present invention may also be custom designed, the design process and features being well within the skill of persons in the art.

The data fielded into database 16 may be conditioned by a data conditioner 18. The data conditioner 18 is one or more applications that perform some operation relative to the data. Data may be conditioned to clean, filter, or otherwise to process data. For example, the data may be conditioned to supply imputed and/or default values to data items missing from a particular field or to eliminate anomalous data that does not meet predefined criteria in terms of class and/or value. In further example, the data may be conditioned to supply missing values; to eliminate data collected during holidays or other non-business days; to eliminate data based on demographic criteria; to check for anomalies; etc. Standard software programming skills may be used to develop desired data conditioning programs.

Conditioned data may be stored in a database 20 for conditioned data. The data collected by the database 16, or other contemplated databases, may be communicated to the data conditioner 18, or other system components such as database 20 or processing module(s) 22 (discussed below), in a continuous stream, in batches at set intervals, or in batches. Communication of data could be made dependent on specified conditions. For example, the specified conditions could include a set quantity of data having been received (e.g., after receipt of one hundred consumer responses to survey questionnaires); an elapsed period of time (e.g., after one hour of collecting responses to survey questionnaires), or other specified conditions or combinations of such conditions.

Databases 16, 20, and 24 are not intended to be limiting examples of databases that are used in the present invention. Additional databases may be incorporated into system 10 besides those specifically indicated. These additional databases may be for the receipt of raw data, conditioned data, or processed data that flows through system 10, or selected categories of such data. It should also be appreciated that the databases may reside on the same hardware components or different hardware components. The databases could also be operated under the same or different DBMS.

One or more data channels 15 may be defined for the transmission of data between the components of system 10. As used herein "data channel" means a logical event, not necessarily a physical channel, directing the flow of data into computer storage and/or processing systems. Data channels are determined by the structure of, for example, a survey questionnaire, or the way answers are coded into database fields, and the programs that are to operate on predefined categories or items of data. A data channel may also be a logical or computed combination of other data channels.

Looking at FIG. 3, one or more data channels 15 communicate parsed data from server 14 to assigned fields in database 16. More specifically, there could be a data channel assigned to each attribute 102–110 for communicating the ratings from rating fields 112 into the field in the database that correspond to each attribute 102–110. Similarly, one or more data channels 15 may communicate data from defined fields in database 16 to data conditioner 18. For example, raw data from database 16 or conditioned data from database 20, may be introduced into database 20 or directly into a processing module(s) 22 consisting of one or more processing modules that perform a predetermined operation on data. The processing modules may be in communication with each other or with other system components. As shown in FIG. 3, processing module(s) 22 transfer processed data to a database 24 for storing processed data. Database 24 is in communication with a server 26 Server 26 may be a web server for interfacing with remote computer systems in system 11. Web server 26 may be used to present data from database 24 to remote computer systems 12 or 13 over a network 11. Alternatively, presentation server 26 could present the data to a printer 34 or video display or computer system 36, or through other means for displaying data. (As used herein, "data" includes data in the form of files or data representing information, unless otherwise noted or clear from the context.)

One or more data channels 15 may communicate data from database 20 to processing module(s) 22. Although not illustrated in all cases, it will be understood that any other components of system 10 may communicate defined fields of data to another system component along a data channel assigned to a field(s) of data.

It is to be understood that the data channels depicted in FIG. 3 are for illustrative purposes only and should not be construed as a limitation on how data may be communicated between system components, other paths being within the spirit and scope of this disclosure. For example, data conditioner 18 is optional; although not illustrated, data may be directly introduced from database 16 into a processing module 22.

Processing modules 22 may process data communicated to it to generate desired forms of information. The processing may include computation of ratings; indices; consumer demographic profiles; merchant or merchant category session volumes; dollar volumes; lists of consumers for target marketing; etc. As used herein, such data or information may be referred to as "e-commerce" data or information. Standard software for such processing is well known and available, or may be readily created by persons skilled in the art, and therefore is not discussed further herein.

In the case of survey questionnaire 100, the processing module 22 could be programmed to compute ratings for each attribute 102–110, and other standard statistical values based on the ratings data. Accordingly, a statistical analysis process module would be capable of computing one or more of the following:

Means using real numbers
Mean scores using factors (useful for rating scales)
Standard deviation
Standard error
Error variance
Z-tests (four tests for the difference between proportions)
T-tests (two tests for the difference between means)
P-values (a test of the probability that an event was chance)
Significance net difference test (on pairs of columns)
Least significant difference test (on means)
Paired preference test (on pairs of rows)
Chi-squared tests (one or two dimensional and single classification types)
Proportions tests (four types)
Friedman's two-way analysis of variance
Kolmogorov-Smirnov test (on differences between two samples)
McNemar's test of the significance of changes
F-test for testing differences between a set of means
One-way analysis of variance (ANOVA)
Significance levels
Regression analysis
Trend analysis
Correlations
Covariances The software for statistical analysis could be designed using programming skills well within the skills of persons in the art. Well-known, off-the-shelf programs are also available. Such programs include the SPSS family of software products, including SPSS BASE PROFESSIONAL, v10.5 or v8.0, and Regression, Table and/or AnswerType module from SPSS, Inc., Chicago, Ill.

The processed data may then be transferred to a "display store" database 24 for storing processed data or information. Database 24 may be connected to a presentation server 26. The presentation server 26 presents data that has been processed and evaluated by system 10 to an end-user, such as consumers or merchants 13. The display store information may be accessible publicly or privately via computer systems in system 11. Server 26 parses and sorts processed information into categories that are defined according to defined needs or interests of an end-user or group of end-users. The software for doing this must be coded according to the intended application of the user. The coding may be written in standard programming codes that are known to persons skilled in the art. The relevant information may be presented to the end-user in any known form of communicating information, including: printed reports, emailed reports; server-stored reports accessible to end-users over a public or private network, including website posted reports. The presentation server may serve web pages to remote computers systems through conventional TCP/IP protocols or other known protocols. The web pages may be presented through conventional web browsers such as INTERNET EXPLORER series of web browsers by Microsoft Corporation, or the NETSCAPE COMMUNICATOR series of web browsers by Netscape Communications Corporation.

The following section describes an embodiment of system 5 that is adapted to process data from survey questionnaires 100 or 200 from a sample of survey questionnaires from consumers that did business with online merchants. The survey questionnaires may be supplied to data capture server 14 at predefined intervals, in real time, or upon other specified condition. As will be clear after the detailed discussion of modules 221–223 provided below, the present invention can allow daily or more frequent updates of usable information to end-users even though only small and/or noisy data samples are available. Accordingly, the present invention sets new standards for minimizing the "time late" for turning data into information.

FIGS. 5a–e show examples of information that may be derived from the ratings from a set of survey questionnaires 100/200 for a particular merchant for transactions occurring over set intervals (e.g., one day, one week, one month, etc.). Referring to FIG. 5a, a table contains the average numerical rating for each attribute 102–110/202–210 on a monthly basis over one quarter. FIGS. 5b and 5c show in graphical form the average ratings from FIG. 5a. The graphs enable users to easily detect upward or downward trends for each attribute. Like FIG. 5a, FIG. 5d shows a table with the average quarterly rating for each attribute shown in FIG. 5a. FIG. 5e is a graphical representation of the quarterly average ratings for each attribute from FIG. 5d.

For simplicity, the following discussion shall be in terms of the Product Price attribute 108, although it should be understood that the principles discussed are applicable to any other attribute 102–110/202–210.

Figures 6A, 6B:
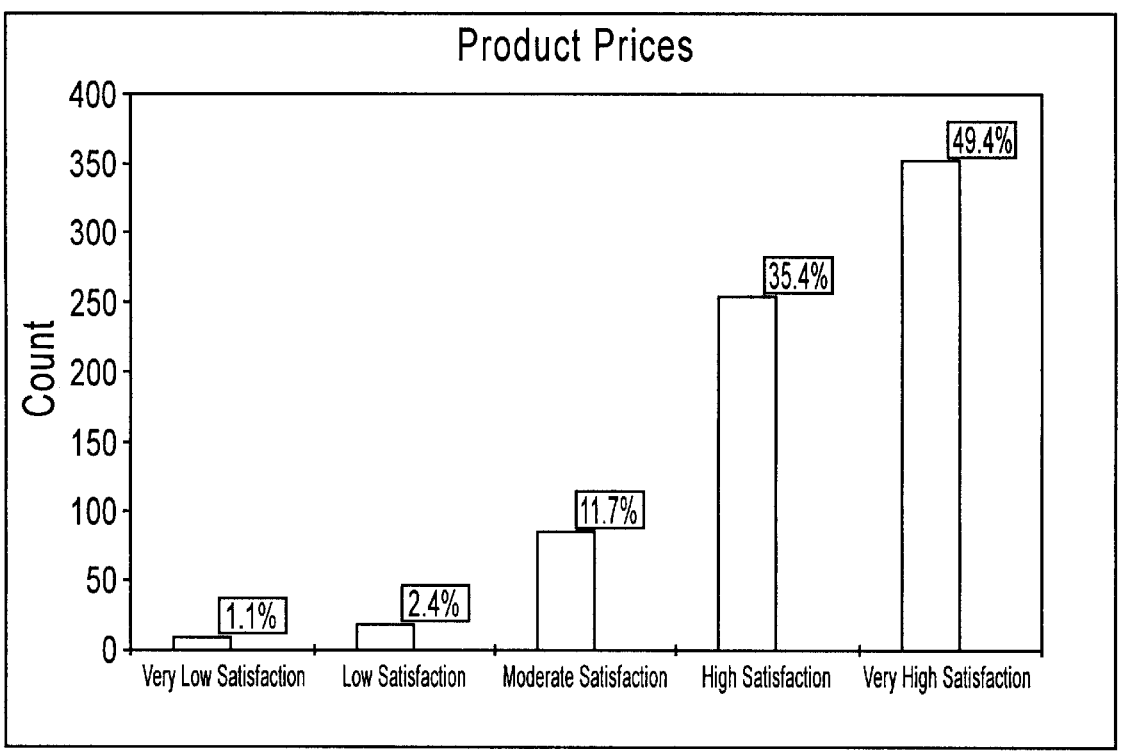
FIGS. 6a–b show means of presenting certain kinds of information processed from data collected from an exemplary consumer survey questionnaire, the information being presented in tabular and graphical formats.

Turning now to FIGS. 6a–b, specific information about price attribute 108 from FIGS. 5a–e is shown in table and graphical formats. The table shows five categories of ratings. A rating of 1–2 corresponds to "very low satisfaction"; 3–4, "low satisfaction"; 5–6 "moderate satisfaction" 7–8 "high satisfaction"; and 9–10 "very high satisfaction".

Data Stabilizer

Figure 7:
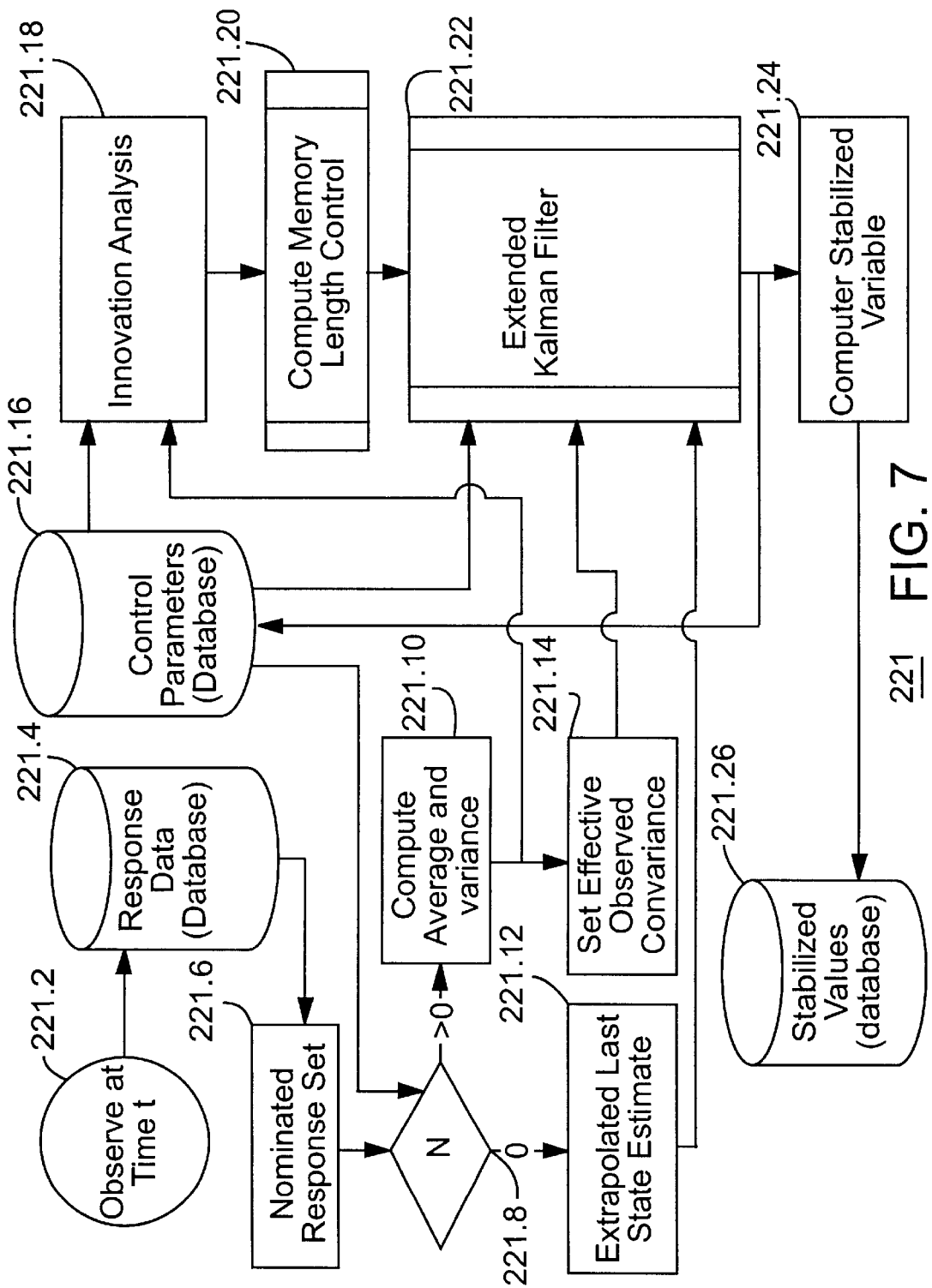
FIG. 7 is a flow chart for a processing module that may be used in the system of FIG. 3.
Figure 8:
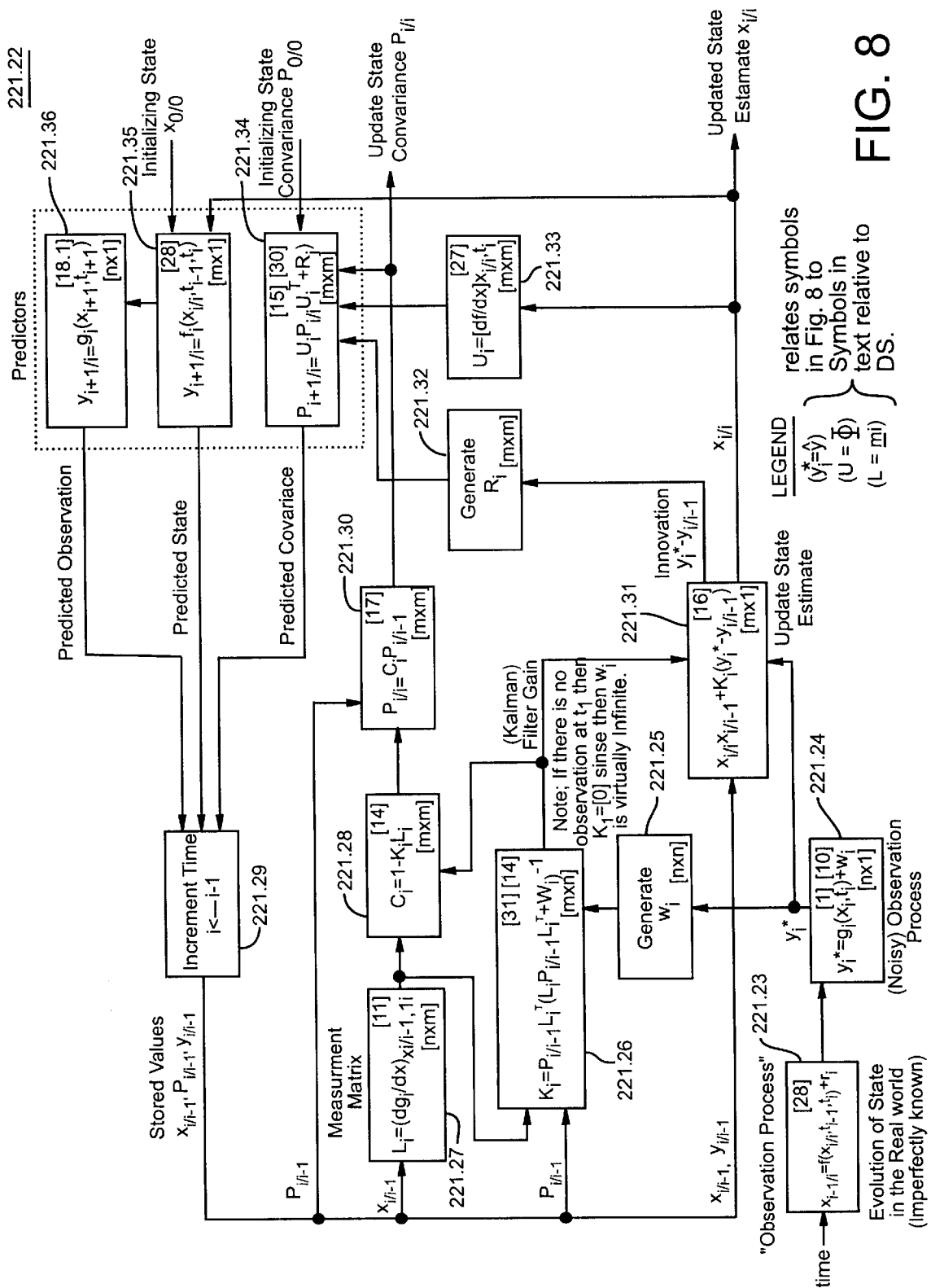
FIG. 8 is a flow chart for steps performed by the processing module of FIG. 7.

FIGS. 7–8 and equations 1–34 below relate to a novel application for estimating or smoothing variable data. The schema presented below is particularly useful for estimating values based on noisy and/or small data samples. It may also be used to predict missing observations. The schema may be incorporated into system 10 as a processing module 22. Through the schema, the present invention offers notable advantages over traditional modes of statistical analysis, such as moving window averages (weighted and unweighted), which do not provide accurate information if data samples are small or noisy. Consequently, in conventional techniques, the conversion of data to useful information is prolonged by the time necessary to collect the larger required sample sizes. Thus, the schema of the present invention provides notable advantages over conventional methods used to evaluate data related to e-commerce. In one possible embodiment, the schema is used to stabilize or filter consumer ratings data. While, for convenience, the following discussion is largely in terms of evaluation of ratings data, the present invention also contemplates use of the schema in evaluating other forms of data related to e-commerce. Accordingly, persons skilled in the art will appreciate that the present invention provides a substantial and patentable advance over prior methods of processing and evaluating such data, particularly in the area of business ratings, market research studies, consumer demographics, etc.

A central component of the schema of FIG. 7 is an Extended Kalman Filter or ("EKF"). The EKF is detailed In FIG. 8. Generally, the EKF uses a computational (recursive) solution of the minimum variance Bayesian estimation method. The EKF is powerful in several aspects: it supports estimations of past, present, and even future states. It can do so even when the precise nature of the modeled system is unknown. In addition to smoothing noisy data, evaluating small samples of data, and providing a basis for estimations, the EKF also provides a method of weighting data values according to the recency or level of noise corruption of the data. This may be important because, for example, data collected in a later portion of a data collection interval (data window) is likely to be more indicative of present trends than is data collected at the earlier portion of the interval (older data).

Continuing with the example of survey questionnaire 100, the present invention provides a sequential filter that outputs an optimal estimate of a "rating" for an attribute 102–110 from a set of responses to survey questionnaires of such rating from a given merchant. The following section describes how the true rating may be determined from noisy data/small sample sizes. (In this section, related Figures, and in subsequent sections, certain mathematical equations are identified by a number in bold and in brackets to the right of a given equation, which number should not be confused with unbracketed reference numerals for the accompanying Figures.).

In one preferred embodiment, a true rating A is determined using an adaptation of an Extended Discrete Kalman filter. It is to be understood that the following embodiment is presented for purposes of illustration not limitation. Persons skilled in the art will appreciate that other adaptations of Kalman filters are within the scope and spirit of the present invention. In connection with the following discussion, reference may be made to FIGS. 7 and 8, which help illustrate the principles being discussed. Hereinafter, a processing module that can smooth noisy or variable data using a computational (recursive) solution of the minimum variance Bayesian estimation method is referred to as a Data Stabilizer or "DS" for short.

It may be assumed that in a noisy sample of ratings observed over a set time interval, the desired "true rating" is actually a slowly varying function of time, while the noisy (input) rating suffers from "sampling jitter" induced by often low response (small sample) and/or highly variable ratings for the input parameters from which the rating is computed.

The true rating A is a scalar valued function of parameter vector y of dimension N.

$$A = f(y) \qquad [1]$$

where y is a vector of sampled variables with mean $\hat{y}$ and possibly correlated dispersions covariance y. Once A is determined, it could be reported as one of the attribute ratings shown in FIGS. 5–6 or used in further computational processes of system 10 or elsewhere. To determine A, it may be assumed that variations of A over time can be described by a second or higher order polynomial in time t.

$$A(t) = c_0 + c_1 t + c_2 t^2 \qquad [2]$$

$$= x^T [t^0, t^1, t^2]^T \qquad [2.1]$$

$$x = [c_0, c_1, c_2]^T \qquad [3]$$

$c_i$ are the components of x, the state vector of constants for the polynomial[2]. A higher order polynomial for A(t) can be used if warranted by the underlying process modeled. (T means "matrix transpose", as is known in the art.)

Observation Process: This "ratings process" is actually observed by a sequence of computed noisy ratings 221.2 at times $t_i$, i=1, 2, 3 . . . such that $t_{i+1} > t_i$. Then $$\tilde{A}(t_i) = h[x(t_i)] \qquad [4]$$

with $$\mathrm{cov}\tilde{A}(t_i) = \left[ \frac{\partial h^T}{\partial y} \mathrm{cov} \underline{y} \frac{\partial h}{\partial y} \right]_{\hat{y}(t_i)} \qquad [5]$$

$\tilde{A}$ is termed the pseudo observable; it is a function of actual observations. In what follows, the time index i may be used to denote the value of a time indexed variable at $t_i$. $\hat{y}$ is the observed parameter vector which itself may be computed from captured survey questionnaire responses.

State Vector: The estimation problem may now be reduced to finding the optimal value $\hat{x}$ of x which is termed the state vector of the process. Then at $t_i$ we have $$x_i = [c_{0,i}, c_{1,i}, c_{2,i}]^T \qquad [6]$$

with covariance $P_i = \mathrm{cov}\, x_i$ [7]. It is noted that $t_{i+1} = t_i + \Delta t_i$ for all i and arbitrary $\Delta t_i > 0$.

State Transition: The estimated polynomial [2] is assumed to be stable over "reasonable" time intervals that encompass the last few observation times. Accordingly, the state transition equation may be written as $$\underline{x}_{i+1} = I x_i + \underline{r}_i \qquad [8]$$

where I is the identity matrix and $\underline{r}_i$ is "state noise" such that $E(\underline{r}_i) = 0$ and $R_i = \mathrm{cov}\, \underline{r}_i$ [9]. It may be further assumed that $\Delta t_i$ are large enough so that $E(\underline{r}_i^T \underline{r}_j) = 0$ for $i \neq j$, i.e. that the noise is uncorrelated over time (explicitly $E(\underline{r}_i \underline{r}_j^T = R_i \delta_{ij})$).

Observation Equation: The pseudo observation $\tilde{A}_i$ then is related to state by $$\tilde{A}_i = m_i^T x_i + w_i \qquad [10]$$

where the pseudo-observation or measurement vector $m_i$ is given by $$m_i=[1, t_i, t_i^2]^T \quad [11]$$

and the measurement noise is $$E(w_i)=0 \text{ and } E(w_i w_j)=W_i \delta_{ij} \text{ for all } i,j. \quad [12]$$

It is noted that the observation covariance $W_i$ is identically the error induced in $\tilde{A}$ by the errors propagating from the actual observed parameters $\tilde{y}$ given in [5]. Therefore we set $$W_i = \text{cov}\tilde{A}_i = \left[\frac{\partial h^T}{\partial y} \square \text{cov} y \frac{\partial h}{\partial y}\right]_{\tilde{y}_i} \quad [13]$$

The estimator elaborated below is the discrete Kalman filter, as described for example, in 1 Brogan, W., *Modem Control Theory*, Prentice-Hall, 1985. The discrete Kalman filter is here adapted to the observed ratings process developed above. In the following description, the subscript j/i denotes a parameter value at $t_j$ computed by input(s) available at $t_i$. The filter gain matrix (in this case a vector) for processing the input at $t_i$ is written as $$K_i=P_{i1/i-1}m_i[m_i^T P_{i/i-1}m_i+W_i]^{-1} \quad [14]$$

where the state noise propagates as captured by the covariance matrix
$P=\text{cov}(x)$ over $\Delta t_{i-1}$ as $$P_{i/i-1}=P_{i-1/i-1}R_{i-1}. \quad [15]$$

If we let $C_i=I-K_i m_i^T$ [16] then the covariance of state at $t_i$ (i.e. cov $x_{i/i}$) is given by $$P_{i/i}=C_i P_{i/i-1}C^T-K_i W_i K^T \quad [17]$$

With these preliminaries, we write the estimate of state for $t_i$ now as $$\hat{x}_i=\hat{x}_{i-1}+K_i[\tilde{A}_i-A_{i/i-1}] \quad [18]$$

(this represents the main equation for Kalman filtering), noting that $$A_{i/i-1}-A_i(\hat{x}_{i-1})=m_i^T \hat{x}_{i-1} \quad [18.1]$$

is the predicted rating. (We use the single subscripts in [18] and elsewhere for simplicity due to the constancy of state evolution as indicated in [8] above.)

From [15] we see that R forms a floor for the error covariance of our estimate $\hat{x}$ since at every stage we propagate error by adding R to the last estimated covariance. We also see that the filter gain K is diminished by encountering a very noisy observation represented by a large W. This lets R be used as the filter memory length controller, i.e. we should believe time late estimates only to the extent that we believe in the validity (or accuracy) of our state transition model [8]. This lets us shorten the memory length by increasing R thereby appropriately abandoning or deweighting past observations.

We recall that the estimate is updated in [18] by multiplying the currently observed "innovation" ($\tilde{A}_i-A_{i/i-1}$) by the filter gain, where "innovation" is the difference between what we actually observed and what we expected to observe. If our state model is good and our filter is working, properly, then the innovation sequence will approach a zero-mean white noise process with covariance given by [5].

Finally, the data stabilizer and its variance is computed from $$\hat{A}_i=m_i^T \hat{x}_i \quad [19]$$

and $$\sigma_i^2(\hat{A}) = \left\{\left[\frac{\partial A}{\partial x}\right]_i^T P_{i/i}\left[\frac{\partial A}{\partial x}\right]_i\right\} \quad [19]$$

$$=m_1^T P_{i/i} m_1 \quad [20]$$

Implementation: The time origin may be set to always represent the present time, i.e. $t_i=0$. This requires some important modifications to the above-derived model, which will make the resulting computations more efficient.

In [8] the transition will now require the use of a non-trivial transfer function $\Phi(i,i+1)$. This is derived as follows:

Let $t_{i-1}=0$ (i.e. at last estimate of polynomial), then using $x_{i-1}$ we can predict $A(t>t_{i-1})$ as $$A(t)=[1, t, t^2]x_{i-1} \quad [21]$$

Now if we shift the time origin by $\Delta t_{i-1}$ to $t_i$, then the new coefficient vector $x_i$ must satisfy $$A(t)=[1, t-\Delta t_{i-1}, (t-\Delta t_{i-1})^2]x_i \quad [22]$$

Equating the corresponding time shifted coefficients then gives $$\left.\begin{array}{l}c_{i-1,0} = c_{i,0} - c_{i,1}\Delta t_{i-1} + c_{i,2}\Delta t_{i-1}^2 \\ c_{i-1,1} = c_{i,1} - 2c_{i,2}\Delta t_{i-1} \\ c_{i-1,2} = c_{i,2}\end{array}\right\} \quad [24]$$

which may be written as $$x_{i-1}=\Phi(i,i-1)x_i \quad [25]$$

where $\Phi(i, i-1)$ is now the system transfer function retrodicting state from $t_i$ backwards to $t_{i-1}$.

$$\Phi(i, i-1) = \begin{bmatrix} 1 & -\Delta t_{i-1} & \Delta t_{i-1}^2 \\ 0 & 1 & -2\Delta t_{i-1} \\ 0 & 0 & 1 \end{bmatrix} \quad [26]$$

Invertible system transfer functions have the property that $\Phi(i-1,i)=\Phi^{-1}(i, i-1)$ [Brogan, p. 291] which we require since we want to go from $x_{i-1}$ to $x_i$. Therefore, $$\Phi_i = \Phi(i-1, i) = \begin{bmatrix} 1 & \Delta t_{i-1} & \Delta t_{i-1}^2 \\ 0 & 1 & 2\Delta t_{i-1} \\ 0 & 0 & 1 \end{bmatrix} \quad [27]$$

which gives us the desired state transition and lets us rewrite [8] as $$x_{i+1/i}=\Phi_i x_{i/i}+t_i \quad [28]$$

The pseudo-observation vector in [11] now becomes simply $$m=[1\ 0\ 0]^T \quad [29]$$

since we are "observing" only $c_{i,o}$ at $t_i=0$.

The estimator equations must now be expanded to include $\Phi_i$. Specifically [15] now becomes $$P_{i/i-1} = \Phi_i P_{i-1/i-1} \Phi_i^T R_f \quad [30]$$

which changes filter gain [14] to $$K_i = [\Phi_i P_{i-1/i-1} \Phi_i^T + R_i] m [m^T (\Phi_i P_{i-1/i-1} \Phi_i^T + R_i) m + W_i]^{-1} \quad [31]$$

And since $t_i = 0$ at all estimation points, we have the output of data stabilizer [19] as $$\hat{A}_i = \hat{x}_{1,i} = \hat{c}_{0,i} \quad [32]$$

with variance from [20] reducing to $$\sigma_i^2(\hat{A}) = (P_{11})_{i/i} \quad [33]$$

where $\hat{A}_i$ is obtained from the current estimate of state now given by $$\hat{x}_{i/i} = \hat{x}_{i/i-1} + K_i[\tilde{A}_i - A_{i/i-1}] = \hat{x}_{i/i-1} + K_i[\tilde{A}_i - (\hat{c}_0)_{i/i-1}] \quad [34]$$

FIG. 7 shows an implementation of the DS into system 5 as a processing module 221. Observed ratings from a survey questionnaire 100 or 200 at a time t are stored in database 20, as described above relative to FIG. 3. A nominated response set is defined in step 221.6 of processing module 221, which in FIG. 3 is represented as one of the processing modules 22. The nominated response set, for example, may be the set of individual ratings for a particular survey questionnaire attribute collected from a particular merchant over a defined interval, such as 24 hours. The nominated response set may be expressed as $Y_i = \{y_j: j=[1,N]\}_i$. A control parameter database 221.16 is used to store process parameters for process module 221. Step 221.8 calls on process 221 to make a decision relative to N for the nominated response set. For N greater than 0, the average value and variance for the set is computed in step 221.10. The effective observed covariance $W_i$ for the values determined in step 221.10 are then determined in step 221.14. $W_i$ is then introduced into the EKF steps 221.22, described above, and shown in flow-chart form in FIG. 8. Returning to decision step 221.8, for N equal to 0, step 221.12 extrapolates the last state estimate by setting $K_i = 0$, which outputs to EKF steps 221.22. EKF steps 221.22 then provide outputs to 221.24 wherein the form of the stabilized or true rating A (which may also be expressed as Variable $v_{stabilized} = x_{i/1}(1)$) and a standard deviation of the data stabilizer (which may be expressed as the square root of $[P_{i/1}(1,1)]$) is extracted. A data stabilizer may then be introduced into a stabilized values database 221.6. This database may be the same as or different from database 24 in FIG. 3. The data stabilizer A or other output of steps 221.22 and 221.24 also may be introduced into other computational processes, e.g., other process modules 22 and/or presentation means, such as presentation server 26.

Data stabilizers may be introduced into control parameters database 221.16 to update it. Averages and variances from process step 221.10, and observed covariances from process step 221.14 may also be introduced into database 221.16 to update. Using control parameters, namely R & W matrices, and specified innovation thresholds from database 221.16, an innovation analysis may be performed in step 221.18 on the $\{\tilde{A}_i = (\hat{c}_0)_{i/i-1}\}$ sequence. Output from step 221.18 may then be used to compute and reset the memory length control $R_i$ (the covariance of the state transfer function) for input to the EKF steps 221.22. Extended Kalman Filter steps 221.22 may also directly access control parameters database 221.16 to obtain inputs to $t_i$, $t_{i-1}$, state vector $x_{i-1/i-1}$ and covariance $P_{i-1/i-1}$ for computing the next state vector $x_{i/i}$ and the covariance of state $P_{i/i}$.

Referring to FIG. 8, the general. EKF steps 221.22 are shown in more detail. Steps 221.23–221.36 represent an observed process having a state x. The state of a process may be denoted as $x_{i+1} = f(x_{i/i}, t_{i-1}, t_i) + r_i$, where $t_i$ represents a point in time. In the real world, the estimate of state x is imperfectly known. In step 221.24 y* represents an average of a set of one or more noisy observations and $w_i$ is the observed covariance. The symbology used in FIG. 8 generally corresponds to that of Equations 1–34. (EKF 221.22 is adapted for use in determining true rating A in Equations 1–34 above, accordingly the Equations 1–34 may not directly correspond to FIG. 8 in terms of symbology, but any differences in light of the included legend will be understood by persons skilled in the art).

The foregoing estimation model may be implemented in standard programming languages for mathematical functions. Below is one example of the DS model coded in MATLAB programming language. Persons skilled in the art will appreciate that other programming languages may also be used to implement the foregoing principles. The program is used to stabilize ratings from a consumer survey questionnaire:

```
clear all
% read and parse data array
load daily_aval_d      % daily_aval_d = (value, variance, julian date)
nmax = size(daily_aval_d,1);    % number of data points
At = daily_aval_d(:,1);
W = daily_aval_d(:,2);
wmin = 6;          % minimum allowed observation noise
wmax = 30;         % maximum allowed observation noise
W(W>wmax) = wmax;
W(W<wmin) = wmin;
t = daily_aval_d(:,4);
% initialize filter
%xlast = [At(1) 0 0]'; % initial state (quadratic coeffs)
xlast = [6.5 0 0]';
%Plast = [1.5 0 0
%           0 .01 0
%           0 0 .001];                % covar of initial state
Plast = [0.795 0.0082 0
         0.0082 0.0001 0
         0 0 0];
m = [1 0 0];                          % measurement vector
xsigs = (1e-4 1e-5 1e-4];   % coeff DAILY transition sigmas
R = diag(xsigs.*xsigs,0),   % constant DAILY state transition covariance
I = eye(3);
% Output array initialization
StabilizedRatingsout = zeros(nmax,4);
StabilizedRatingsout(1,1) = xlast(1); % initialized input value
StabilizedRatingsout(1,2) = sqrt(Plast(1,1));   % sigma of input value
StabilizedRatingsout(1,3) = t(1);   % time value
% run main loop and generate output array
for i = 2:nmax
    dt =   t(i)-t(i-1);       % current time increment (should be 1)
    U =    [1 dt dt^2
            0 1 2*dt
            0 0 1];           % state transition matrix
    if At(i)= =99             % then extrapolate from last estimated state
        StabilizedRatingsout(i,1) = [1 dt dt*dt]*xlast;   % extrapolated
estimate of value
        Pnow = U*Plast*U' + R;   % extrapolated state covariance
        xnow = U*xlast;   % extrapolated state
    else % run filter with current observation
        w = W(i);         % pseudo-observation variance
        Pnext = U*Plast*U'+ R;   % predicted state covariance
        temp1 = Pnext*m';
        K = temp1/(m*temp1 + w);   % filter gain
        C = I - K*m;
        Pnow = C*Pnext;   % current cov of estimated state
```

-continued

```
        xnext = U*xlast;        % predicted state
        innov = At(i) - xnext(i);    % innovation
        xnow = xnext + K*innov;    % current estimate of state
              StabilizedRatingsout(i,4) = innov;
    end % conditional extrapolate or filter calcs
    % hard limit c0 to max allowed value of rating
if   xnow(1)> 10
     xnow(1)= 10;
end
        xlast = xnow;
        Plast = Pnow;
        % fill output array
        StabilizedRatingsout(i,1) = xnow(1);
        StabilizedRatingsout(i,2) = sqrt(Pnow(1,1));
end    % main observation/time loop
% compute 25% level   At Risk Threshold ART array
tART = 6.5;    % the selected rating threshold
pART = 0.9995; % the probability that actual rating < tART
limART = norminv(pART,0,1);
rART = StabilizedRatingsout(:,1) + limART*StabilizedRatingsout(:,2);
ART = tART* (rART<tART),     % array of threshold violations
% output results plot.
At(At>10) = 0; W(W>10)=0.5;
figure(1)
clf
hold on
tstart = 245; % full range 245 to 638
tend = 638;
istart = find(t==tstart);      iend = find(t==tend);
indexART = find (ART>0 & t>=tstart & t<=tend);
plot(t(istart:iend),At(istart:iend), 'gx',
t(istart:iend),StabilizedRatingsout((istart:iend),1), 'b' ,
t(istart:iend),StabilizedRatingsout((istart:iend),2), 'b- -')
plot(t(indexART),ART(indexART), 'r*' ,
t(istart:iend),0.1*StabilizedRatingsout((istart:iend),4), 'c.' )
grid
hold off
```

Copyright in the foregoing code is claimed by BIZRATE-.COM.

Alarm Filters

Along any data channel, there is a normative rate of data transmitted and normative values for the data. One or more alarm filter(s) 28 can be set to monitor data rates and send a signal based on deviations from desired thresholds from the normative rate. The normative rate may be based on any defined interval (the "synoptic response rate"). An alarm filter may check for deviations calculated from a sampling of data taken within the normative interval (the "topical response rate"). To set an alarm, a historical or expected arrival rate is determined or set for one or more data channels. The standard deviation may also be determined or set for the arrival rate. A predetermined threshold may be set relative to a topical response rate. The threshold may be set by a system administrator or automatically determined through a selected correlation function. If the alarm filter determines that a threshold is crossed, it triggers an alarm that may be sent to an event handler.

For example, a normative interval may be set at one month as the period over which a consumer survey questionnaire is collected from a particular merchant's website. Suppose the response rate for a particular merchant's consumer survey questionnaire averages 300 per 30-day period. This average is the historical arrival rate. This gives an average of 30 surveys collected per day. An alarm filter could be set to monitor the number of surveys collected per day from a particular merchant. The system administrator could desire that if the daily collection of surveys for the merchant drops below 5 on a given day, an alert signal should be sent to the merchant or other party. This would allow the merchant to investigate the reason for the drop in response rate. The system 5 via event handler 32 or data. monitoring system 30, for example, could automatically send the merchant a signal such as an email to alert the merchant to the drop in rating. The merchant could then investigate the reason—perhaps competitors have dropped their prices, causing consumers to shop elsewhere, or perhaps the survey questionnaire is not being presented to purchasing consumers due to technical reasons. With respect to survey questionnaire response rates, there could be correctable reasons for the alarm: a webmaster of a merchant website may have inadvertently deleted from a web page the prompt for a consumer survey questionnaire or placed it in a location on a web page that does not sufficiently attract consumer attention or interest. An alarm would give the system administrator an opportunity to investigate why the response rate has decreased or increased allowing data flow to be maintained at desired or useful levels.

Alarm filters 28 may be associated with the processing modules 22 to give, online merchants the ability to respond to changes in the marketplace at the earliest possible stage and to correct technical problems. In FIG. 3, the filters 28 are shown connected to one or more data channels 15 between server 14 and database 16. An alarm filter 28 may be associated with any data channel or channels between two system components. The alarm filters 28 could also be associated with any other data channels 15 in system 5. The alarm filter sends a signal to an event handler 32 when a specified condition is met. The event handler 32 could be a computer system, a display device, telecommunications device such as pager or phone, etc. The event handler 32 would inform a machine or person, such as a system administrator, end-user or other designated individual of the alarm.

Figure 9:
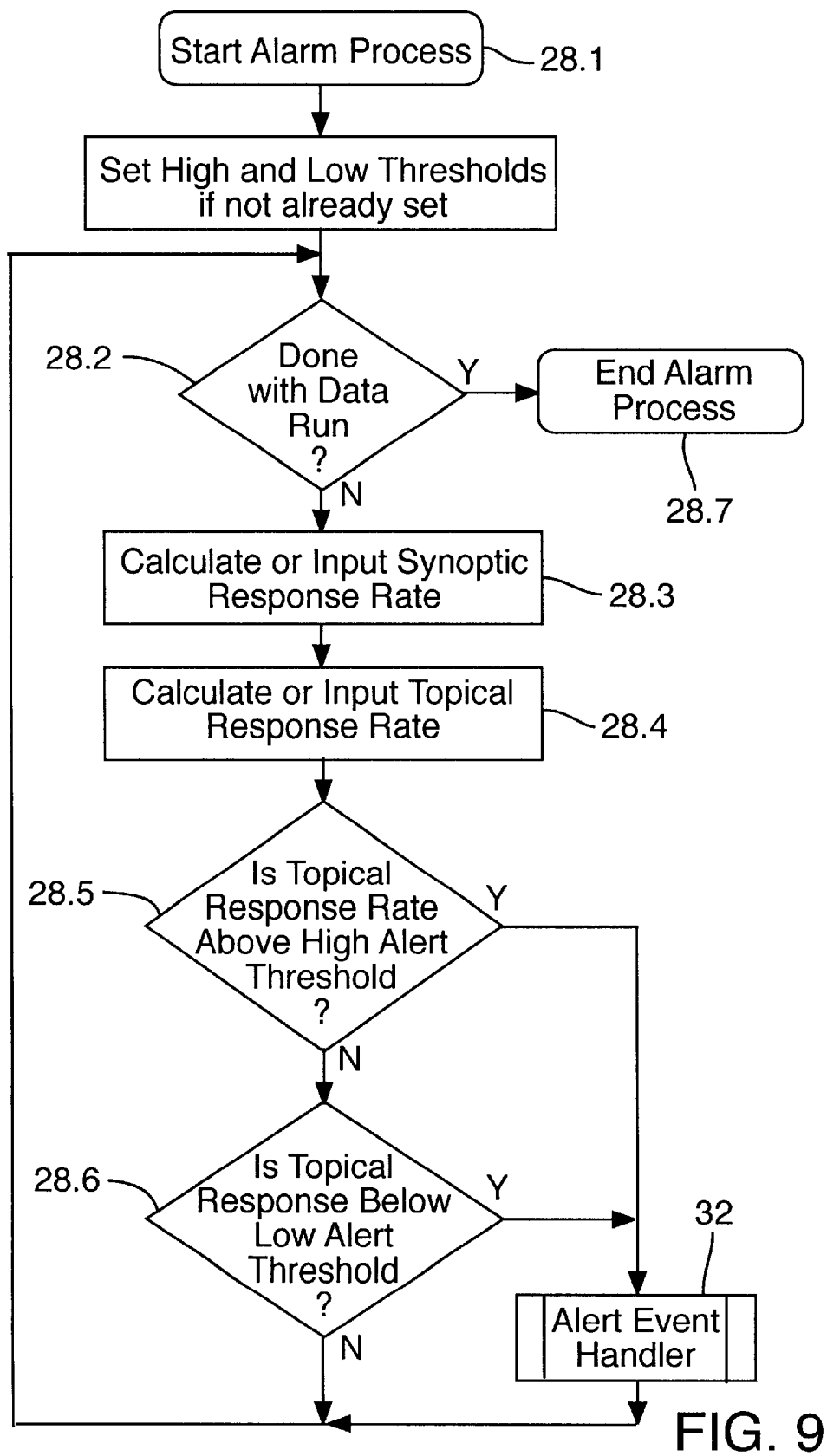
FIG. 9 is a flow chart of an alarm filter system, according to the present invention, that activates an alarm under specified conditions.
Figure 10:
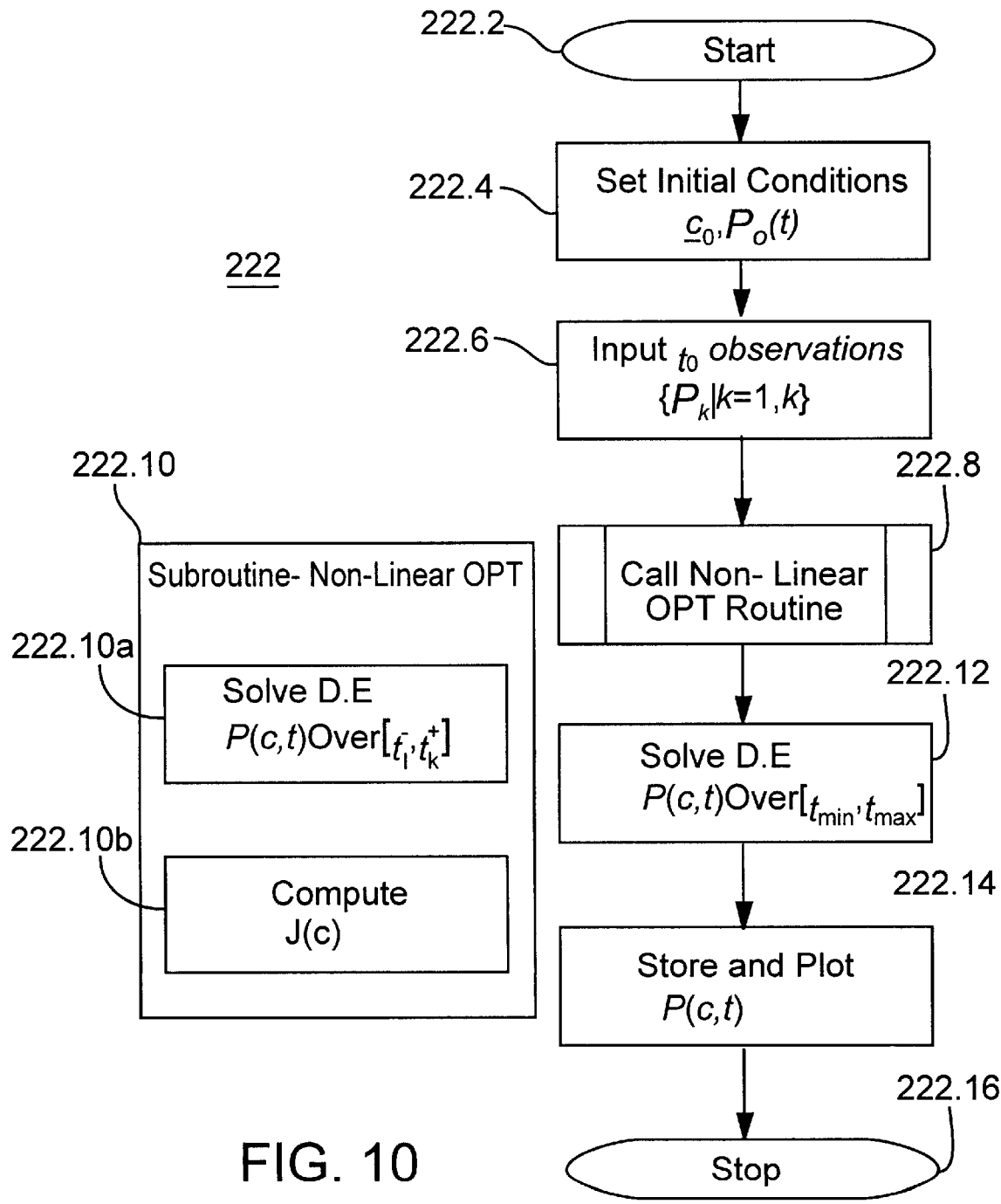
FIG. 10 is a flow chart for a processing module that may be used in the system of FIG. 3.

FIG. 9 shows a flow chart of one possible alarm filter for monitoring survey questionnaire response, rates. The alarm process 28.1 is started with a data run in.system 5. In decision step 28.2, the alarm system monitors a data channel for activity. If the system is not in an active data run, the alarm process ends in step 28.7. If the system is active, in step 28.3, synoptic response rates are calculated or input per a set interval of time. In step 28.4 topical response rates are calculated or input per a set interval of time. The calculated values are compared with predetermined high thresholds in decision step 28.5. If a response is above a high threshold, a signal is sent to event handler 32. If the high threshold is not crossed, the values from step 28.4 are compared to a predefined low threshold in step 28.6. If the low threshold is crossed, a signal is sent to event handler 28. If neither a high or low threshold is crossed, the system returns to the start step 28.1.

The software code for the foregoing may be implemented in any number of programming languages within the skill of persons in the art. As an example, MATLAB source code for one possible alarm filter process is as follows:

```
% 'rrmonitorHIGH.m' Response Rate Monitor computes response
% number thresholds for high (resps/day >= 30) arrival rates.
% Copyright Bizrate.com
clear all
% low arrival rate
M = 100;      % length of data run (number of days)
lam = 500;    % mean arrival rate (responses per day)
sqrtlam = sqrt(lam);
R = poissrnd(lam,1,M); % responses data array
Phigh = 0.9;   Plow = 0.1; % high/low prob thresholds
nhigh0 = norminv(Phigh,lam,sqrtlam);   % high number threshold
nlow0 = norminv(Plow,lam,sqrtlam);    % low number threshold
N = 30; % length of data window for computing lam
figure(1)
```

-continued

```
clf
hold on
plot(R)
plot([0,M],[nhigh0,nhigh0], 'r')
plot([0,M],[nlow0,nlow0], 'r')
errorcount = 0;
for i = N:M-1        % cycle through the data run
    lastN = R(1,i-N+1:i);
    lam = sum(lastN)/N; % average of last N data points
    sqrtlam = sqrt(lam);
    nhigh = norminv(Phigh,lam,sqrtlam);    % upper threshold
    nlow = norminv(Plow,lam,sqrtlam);      % lower threshold
    plot(i+1,nhigh, 'b.')
    plot(i+1,nlow, 'b.')
    if R(i+1)>=nhigh      % test for issuing 'high alert'
        if R(i+1)>= nhigh0
            plot(i+1,R(i+1), 'go')
        else
            plot(i+1,R(i+1),'ro')    % erroneous alert
            errorcount = errorcount + 1;
        end
    elseif R(i+1)<=nlow % test for issuing 'low alert'
        if R(i+1)<= nlow0
            plot(i+1,R(i+1), 'go')
        else
            plot(i+1,R(i+1), 'ro')    % erroneous alert
            errorcount = errorcount + 1;
        end
    end
end
grid
hold off
errorcount
% 'rrmonitorLOW.m' Response Rate Monitor computes response
% number thresholds for low (resps/day < 15) arrival rates.
clear all
% low arrival rate
M = 100;        % length of data run (number of days)
lam = 3;    % mean arrival rate (responses per day)
R = poissrnd(lam,1,M);    % responses data array
Phigh = 0.9; Plow = 0.1; % high/low prob thresholds
nhigh0 = poissinv(Phigh,lam)+1;    % high number threshold
nlow0 = poissinv(Plow,lam);    % low number threshold
N = 15; % length of data window for computing lam
figure(1)
clf
hold on
plot(R)
plot([0,M],[nhigh0,nhigh0],'r')
plot([0,M],[nlow0,nlow0],'r')
errorcount = 0;
for i = N:M-1        % cycle through the data run
lastN = R(1,i-N+1:i)
lam = sum(lastN)/N;    % average of last N data points
nhigh = poissinv(Phigh,lam)+1; % upper threshold
nlow = poissinv(Plow,lam);        % lower threshold
if R(i+1)>=nhigh    % test for issuing 'high alert'
    if R(i+1)>= nhigh0
        plot(i+1,R(i+1),'go')
    else
        plot(i+1,R(i+1),'ro')    % erroneous alert
        errorcount = errorcount + 1;
    end
elseif R(i+1)<=nlow % test for issuing 'low alert'
    if R(i+1)<= nlow0
        plot(i+1,R(i+1),'go')
    else
        plot(i+1,R(i+1),'ro')    % erroneous alert
        errorcount = errorcount + 1;
    end
end
end
grid
hold off
errorcount
```

Copyright in the foregoing code is claimed by BIZRATE.COM.

Saturation Limited Forecast Model

The present invention also provides a saturation limited forecast model (hereinafter "SLF Model") that forecasts the growth of a population from a set of early observations. This model may be integrated into system 5 as a processing module 22. The SLF Model may be used to predict various values of interest to businesses. The forecasting methodology for e-commerce measures and consumer behaviors may be advantageously based on the saturation limited forecasting model of the present invention. For example, the model may be used to predict sales volumes for a category or categories of goods or services; number of females over the age of 18 participating in e-commerce; number of merchants offering a certain category of goods or services. Values for e-commerce measures and consumer behaviors, such as the foregoing may be referred to herein as "e-commerce populations." An example of an SLF Model is more specifically shown in FIG. 10 as processing module 222.

More specifically, the SLF processing module uses available recent historical data along with an estimated and/or available saturation "population" function as the basis for a differential equation that defines the growth of a "population" to a maximum attainable level. This differential equation actually embodies a family of realistic "penetration processes" that are found in nature and most areas of human activity. The results from this technical approach avoid the errors often encountered in conventional "constant percent rate" predictor models.

The SLF Model embodies a non-linear mathematical programming solution to select the optimum set of process defining parameters from the defined inputs. Once the nominal penetration function is obtained, the differential equation can be solved for any arbitrary time point in the future to provide the synoptic or nominal value forecast. Depending on the nature of the historical data set, the SLF Model also can extract the cyclic (i.e. seasonal or topical) variations for the predicted population. Additionally, by entering a range of values for the inputs, the SLF Model will generate a "forecast funnel" that encompasses the confidence intervals of such input data.

In the SLF Model, the growth of a population may be forecasted from a set of early observations. To do this, we assume that there is a known or assumed, possibly time varying, population level $P_0(t)$ or "pull function" which sets the saturation limit to growth. A primary SLF Model operating principle is that growth is generated by an underlying process and that the rate of growth at any time is proportional to the unsaturated or remaining population. The proportionality is specified by a time varying penetration function r(t) which characterizes the total "level of effort" process. The population growth differential equation can then be written as $$\frac{dP}{dt} = r(t)[P_0(t) - P(t)]$$

A functional form, usually, but not limited to, a polynomial with coefficient vector c, is then assumed for the penetration function giving r(c,t). The differential equation is then numerically integrated to generate the predicted population P(c,t). If we have a set of observations $\{P_i | i=1, \ldots, N\}$, then we can solve for the value of c* that makes P(c*,t) a best fit to. these points in, say, a least squares manner. In short, we numerically solve $$c^* = \underset{c}{\operatorname{argmin}}\left\{\sum_{i=1}^{N}\left(P_i - \left[\int_{t_0}^{t_F} r(c,t)[P_0(t) - P(t)]\,dt\right]_{t_i}\right)^2\right\}$$

where $t_0$ may be specified (along with $t_F$) or included in the optimized parameter set.

Turning now to the novel forecasting method in further detail, in [1] (bracketed numbers refer to the equations herein with the corresponding bracketed numbers) a population is penetrated at a rate proportional to a residual population $P_r$. The proportionality is determined by a penetration function r(t) which captures the level of effort expended in order to penetrate $P_r$ and, possibly, maintain the achieved penetration P(t). We further assume the influences of time-varying saturation level $P_0(t)$ which yields the residual $$P_r(t) = P_0(t) - P(t) \quad [1]$$

giving the penetration rate as $$\frac{dP}{dt} = r(t)P_r(t) \quad [2]$$
$$= r(t)[P_0(t) - P(t)]$$

Figure 11:
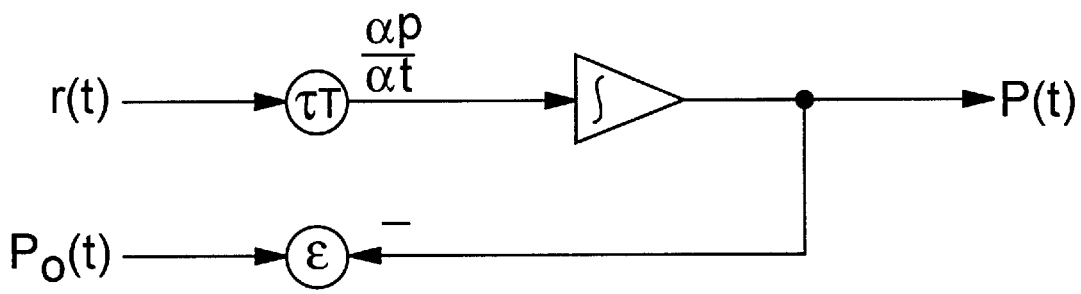
FIG. 11 is a schematic representation of functions related to the processing module of FIG. 10.
Figure 12:
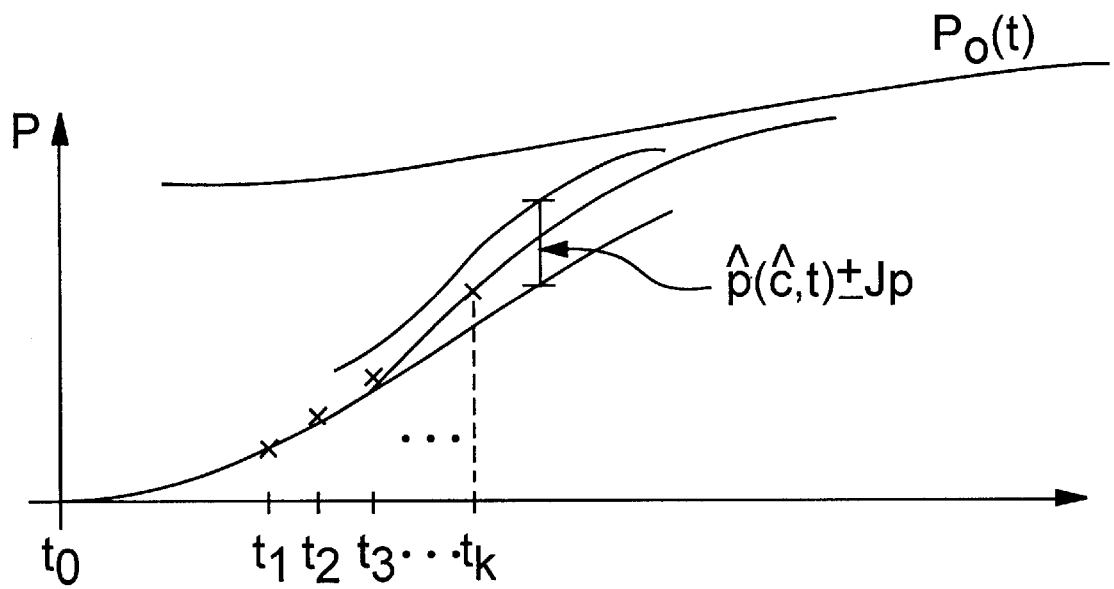
FIG. 12 is a graphical representation of functions related to the processing module of FIG. 10.

For arbitrary r and $P_0$ function, the solution to [2] is schematically shown in FIG. 11.

PROBLEM STATEMENT: Suppose we have a usable estimate of $P_0$ and several values of P, say $\{P_k; k=1,K\}$, for arbitrary times $t_k$, with K equal to the number of observed points. If we also assume a functional form for r( ) that requires knowledge of a parameter vector $c^T = [c_1, c_2, \ldots]$ of constants, then we would like to devise a method of using the $P_k$ to extract $\hat{r}(t) = r(\hat{c}, t)$ such that [2] can be numerically solved to yield $\hat{P}(t)$ and $\sigma_p$, which are graphically represented in FIG. 12. The $\sigma_p$ bounds shown may be derived by stochastic sampling of the probability distributions characterizing the inputs or simply approximated from the solutions using the max and min ranges of the saturation function $P_0$.

Note the addition of $t_0$ defined from $P(t \leq t_0) = \emptyset$. The inclusion of to as a hard constraint may only be required if we seek an analytical solution to [2] as discussed in [1]. In other words, $t_0$ is implicit in the selection of expressing the $t_k$.

We need to extract the optimum $\hat{c}$ that yields $P(\hat{c},t) = \hat{P}(t)$. This optimum population growth function is derived from minimizing $$J(c) = \sum_{k=1}^{K}\left[P(c, t_k) - P_k\right]^2 \quad [3]$$

which then defines $$\hat{c} = \underset{c}{\operatorname{argmin}} J(c) \quad [4]$$

The problem is that with any time-varying (i.e. realistic) $P_0(t)$ it is not possible to solve $$\frac{dP}{dt} = r[P_0 - P]$$

to yield an analytic expression as a function of some parameter vector such as c. For a given c we can obtain P(c,t) only by numerical solution of the differential equation. This suggests the core computational scheme for $\hat{P}(t)$ (SLF 222) shown in FIG. 10 in steps 222.2–222.16.

In SLF, the prime saturation or "pull" function drives $$\frac{dP_1}{dt} = r(t)[P_0 - P_1]$$

with forecast horizon $t_0, k_0$. The prime or top level pull (saturation limit) $P_0$ draws and meters the growth of $P_1$. These concepts are graphically shown in FIG. 13. Once $P_1$ is generated, it can act as the pull function for the next contained/constrained population $P_2$ and so on. Each saturation limited population $P_l$ is generated from an input set that contains its birth time $t_{l,0}$ and a set of observed tuples $\{P'_{l,k}, t_{l,k} | k=1, K_l\}$. (An example table of such tuples is presented in FIG. 14.) Proper birth times are $t_{l,0} \geq t_{l-1,0}$ for $l=1,2,\ldots$ Proper observations are such that $$P'_{l,k} > P_{l-1}(t_{l,k}) \forall l, k$$

Figures 13, 14:
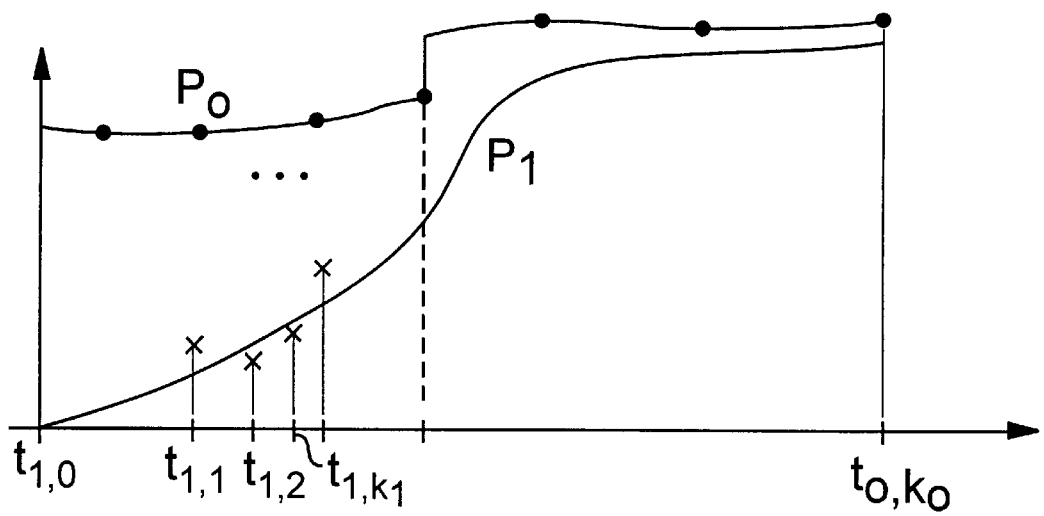
FIG. 13 graphically illustrates that the prime pull (saturation limit) $P_0$ draws and meters the growth of $P_1$, in accordance with the principles of the processing module of FIG. 10.
FIG. 14 is an input array related to the processing module of FIG. 10.

This input horizon for all SLF forecasts is $t_{0,K_0}$ since no successive pull function can be computed beyond that horizon. All birth times are such that $t_{0,l} \geq t_{0,l-1} \forall l$. FIG. 14 shows an example input array for SLF, including conjoined observations and predictions for all l and $K_l$.

The foregoing forecasting model may be implemented in standard programming languages for mathematical functions. Below is one example of the forecasting model coded in MATLAB programming language. The population being evaluated is a hypothetical Food & Wine commerce sector.

```
% Saturation Constrained Forecast Diff Eqn test solver
% Quadratic penetration, free birth tine t0, weighted observations
clear all
global CONST OBS NOBS TINT W
% Prime Saturation ('Pull') Pop function constants
p = 16096; q = 199;
% Penetration Function constants r = a+bt+ct^2 and birth time.
a = .00001; b = 0; c = 0; t0 = 0;
CONST = [p q a b c t0];
% Master time interval
tmin = 0; tmax = 30;
TINT = [tmin tmax];
% observed pop levels
tobs = [9 10 11 12 13];
Pobs = [20 40 87 210 385];
W = [10 1 1 1 1]; % observation relative weights
%W = [1000 10 30 50 100]; % observation relative weights
W = W/sum(W); % normalized weights
% cyclic compensation inputs
nforecasts = 6;         % nforecasts <= tmax − max(tobs)
Ncycle = 4;             % length of cycle >= NOBS
fcomp = .8;             % correction factor to compensations
NOBS = size(tobs,2);
OBS = [tobs; Pobs];
% compute Pen (J) Funct constants
X0 = [a b c t0]; % initial X value
ub = [.01 .01 .01 min(tobs)−1];    % upper bound on X
lb = [−0.01 −0.01 −0.01 −10];      % lower bound on X
options = optimset('MaxFunEvals',2000);
```

-continued

```
[X,J] = fmincon('Jfun33',X0,[ ], ...
[ ],[ ],[ ],lb,ub,[ ],options);
% compute the optimal P function from P(TINT(1))=0
[T,P] = ode45('dp33',[X(4) TINT(2)],0);
P0 = CONST(1) + CONST(2)*T;
% compute cyclically compensated forecasts
mindif = T - OBS(1,1);
maxdif = T - OBS(1,NOBS);
imin = find(abs(mindif) = = min(abs(mindif)))-1;
imax = find(abs(maxdif) = = min(abs(maxdif)))+1;
c = polyfit(T(imin:imax) ,P(imin:imax) ,3);
obsComps = OBS(2,:)./polyval(c,OBS(1,:))-1;
nstart = max(tobs)+1;
foreTimes = [nstart:nstart+nforecasts-1];
nomforecasts = polyval (c,foreTimes);
compfore = zeros(1,nforecasts);
iOffset = mod(NOBS,Ncycle);      % index offset in Obs array
for i = 1:nforecasts
    compfore(i) =
nomforecasts(i)*(1+obsComps(iOffset+max(mod(i,Ncycle),
(mod(i,Ncycle)= =0)*Ncycle))*fcomp);
    % compfore(i) = nomforecasts(i);
end
% generate figure
figure(1)
clf
hold on
Forecasts = compfore; Measured = Pobs;
NomGrowth = P;
plot(tobs,Measured,'rx',foreTimes,Forecasts,'go')
plot(T,NomGrowth,'-',T,P0,'- -')
axis([0 tmax 0 NomGrowth(foreTimes(size(Forecasts,2)))])
%axis([0 20 0 800])
set(gca, 'XTick', [0:1:tmax])
title('SLF Food&Wine')
xlabel('Qtrs - 95Q4=0')
ylabel('Online Sales $M')
legend('Measured','Forecasts','NomGrowth')
grid on
hold off
function J = Jfun33(X)
% criterion function for SALIMx, gjr 7apr99/27apr99
global CONST OBS NOBS TINT W
% solve DE and compute Saturation Level array
CONST(3) = X(1);   CONST(4) = X(2);
CONST(5) = X(3);   CONST(6) = X(4);
[T,P] = ode45('dp33',[X(4) 1.1*OBS(1,NOBS)],0);
% fit solution poly P(t) over observation interval
mindif = T - OBS(1,1);
maxdif = T - OBS(1,NOBS);
imin = find(abs(mindif) = = min(abs(mindif)));
imax = find(abs(maxdif) = = min(abs(maxdif)))+1;
c = polyfit(T(imin:imax),P(imin:imax),3);
Ppoly = polyval(c,OBS(1,:));
% compute criterion function
jcomps = Ppoly - OBS(2,:);
jcomps = (jcomps.*jcomps)*W';
J = sum(jcomps);
function dy = dp33(t,y)
global CONST OBS NOBS TINT W
P0 = CONST(1) + CONST(2)*t;
dy = (CONST(3)+CONST(4)*t+CONST(5)*t*t)*(P0 - y);
if dy<0
    dy = 0;
end
```

Copyright in the foregoing code is claimed by BIZRATE.COM.

Dynamic Activity Icon

The present invention also contemplates a processing module 22 that relates to the display of a dynamic icon that[]indicates to the user of a remote computer system some level of activity elsewhere in system 10. The dynamic icon could convey graphic or text-based information or both, as described in more detail below. In one possible embodiment, a dynamic icon or text is displayed through the web browser of a consumer's computer system or terminal that indicates to the consumer the level of activity by other visitors to a particular merchant's website. For example, the dynamic icon indicates the current/recent level of buying activity for the merchant. The activity could be indicated on a real-time basis or on defined time intervals. It could also relate to all transactions taking place at the merchant's site or on subcategories of transactions. In one embodiment, the dynamic icon is associated with ratings information about one or more merchants whose ratings are made accessible to consumers .through presentation server 26. The dynamic icon could also be associated directly with a merchant's own web server, via presentation server 26 of system 5, for viewing by consumers as they visit the merchant's website.

In the case of buying activity, the relevant data is received into system 5 as a survey questionnaire 100, for example. If survey questionnaires are served only to purchasing consumers, tracking the number of served questionnaires for a particular merchant, directly indicates the level of buying at a particular merchant. Alternatively, each survey questionnaire returned by a consumer could be correlated to buying activity (A correlation is necessary because not all purchasing consumers will complete and return a survey questionnaire.) The survey questionnaire contents may also be used to determine the activity level of other matters contained or associated with a survey. For example, the survey questionnaire may ask the purchaser to describe items purchase, quantities, prices, etc.

Alternatively, electronic cookies may be used to follow consumers to certain categories of websites or to specific websites. The cookies could be. received by data capture server 14. The presentation server could let consumers and/or merchants know which websites are receiving the most traffic. The traffic could be reported, broken down by category of trade. For example, the online music store website with the most traffic. This should help consumers identify where there are special promotions or available products, etc. This should help merchants understand what their competitors are doing for market research purposes or for competitive response.

Figure 15:
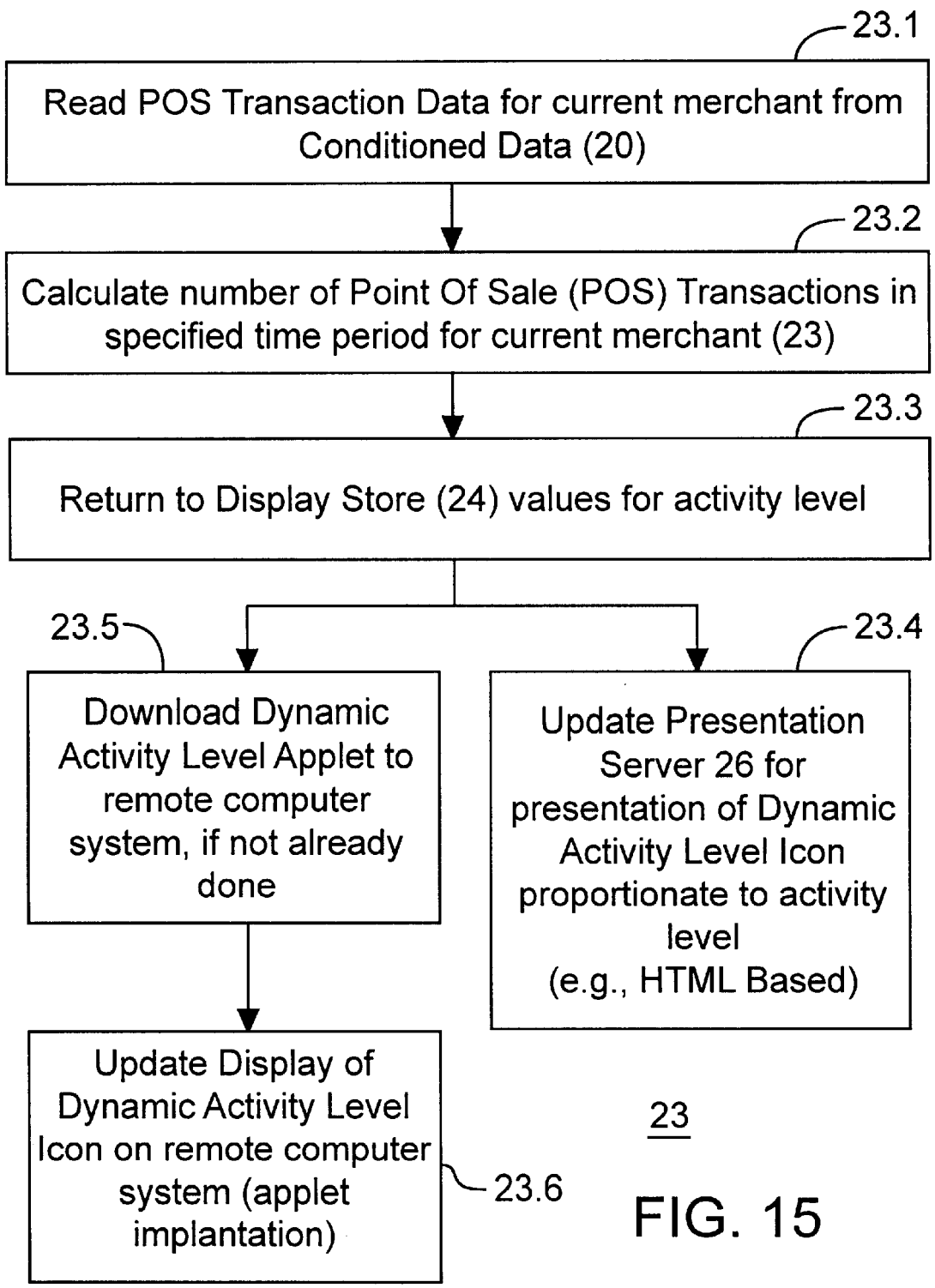
FIG. 15 is a flow chart for a processing module that may be used in the system of FIG. 3.

The methodology for a dynamic icon that communicates the level of activity of some predefined subject mater is well within the skill of persons in the art. For example, FIG. 15 shows a flow chart for an activity module process 23 that receives data input from a data source, such as database 20. The example is in terms of the level of sale transactions on a point-of-sale website. In step 23.1, the point of sale ("POS") data for a merchant is read from database 20. In step 23.2, the number of POS transactions for the merchant is calculated. In step 23.3, the calculated value is returned to display database 24. The calculated value is then accessible to presentation server 26 in step 23.4. Presentation server 26 presents the calculated value as a dynamic icon accessible to remote computer systems through their web browser, for example.

In another embodiment, an activity-level applet is received and stored by a consumer's computer. This is reflected in FIG. 15 at step 23.5. The applet generates a dynamic icon in the form of a flashing dot, for example. The icon flashes in proportion to the level of activity on a particular merchant site. The consumer's computer is informed of the activity level by accessing a data source that communicates data representative of the activity level. This is reflected in step 23.6 of FIG. 15. The data is input into the activity-level applet that creates an output in the dot flashing at a rate proportionate to the level of buying at the merchant's site.

The present invention contemplates that a plurality of dynamic icons may be associated or arrayed with each other. By simultaneously displaying more than one dynamic icon, one or more icons may serve as reference points of activity relative to one or more other icons. In one embodiment, at least two icons are simultaneously displayed, each icon representing activity levels for a different merchant. In a preferred embodiment, the merchants provide competitive goods or services. In another possible embodiment, the dynamic icons are displayed on a consumer's computer and are associated with hyperlinks to the merchants' websites.

In a further embodiment, there are at least two icons simultaneously displayed, one icon representing activity at a merchant website, and the other icon being a reference icon that represents a predefined level of activity against which other displayed dynamic icons may gauged. In a further embodiment, there are at least three icons simultaneously displayed, at least two of which represent activity at competitive merchants, and at least one of which represents a reference icon. In addition, the present invention also contemplates simultaneous display of multiple groups of competitive merchants. It also contemplates that the activity level may represent a variety of things, and is not limited to level of point-of-sale activity. For example, it could indicate level of traffic at the site; types of productsor services being sold or offered; numbers of. a product or service type or category being sold; inventory levels; special promotions or discounts; buyer demographical attributes, etc.

Consumers could investigate websites based on their interest in a level of indicated by a dynamic icon. For example, a relatively high rate of activity could mean exceptional prices, special offerings, good reputation, etc. This gives consumers (or merchants) a basis for comparing the level of activity between merchants. It also helps promote consumer confidence in e-commerce.

With respect to the foregoing embodiments, a Poisson random number generator may be used to generate a sequence of numbers that represents arrival rates. The number of survey questionnaires served or the number of completed surveys received, for a predetermined interval, could be the basis for the input of the mean rate into the Poisson random number generator. The mean arrival rate would then be sent from a presentation server or communicated to a consumer's computer, for example, as input into the activity-level applet implementing the Poisson random number generator on a consumer's computer.

The dynamic icon is not limited to a flashing dot. It could be any number of things, including a numerical value; textual description of activity; a graphic image that connotes a level of activity, such as a flashing colored, say, red dot; an audio-based icon that verbally or connotatively describes some level of activity, etc.

Infomediary Service

The foregoing embodiments, including DS, SLF, response rate alarm filters, and dynamic icon may be incorporated into a system that assists consumers in making e-commerce decisions, particularly which merchants to purchase from. (The system would also be applicable and readily adaptable to business-to-business e-commerce).

In one possible embodiment, the presentation server 26 is a web server that hosts an "infomediary website" (as described by Hagel, John III and Singer, Marc in Net Worth; Boston, Mass.; Harvard Business School Press 1999) that consumers may access through computer systems via the Internet or other network. The website includes web pages having a list or table of merchant websites. The list or table could categorize merchants in any way, including by sector, by size, by how long they have been in engaged in e-commerce, by geography, by customer satisfaction ratings, by specials offered, etc. A displayed list of one or more merchants may be displayed to a consumer by the consumer selecting desired categories from a menu on a web page. Alternatively, the displayed list may be generated based on search criteria entered by a consumer and presentation of results by a search engine. Each merchant displayed could be associated with a dynamic icon showing selling activity, for example.

The consumer may access a displayed merchant's website through hyperlinks in the list or table. Preferably, the list or table includes ratings for each displayed website, to help consumers evaluate the website for relevant attributes, such as those of survey questionnaires 100 and 200. Other information about the merchant could also be displayed or accessed through associated hyperlinks. Ratings and other information could be based on data processed through the DS, SLF, or any other module of the present invention. The list or table also may include icons or information denoting merchant websites that participate in consumer rebate programs. The infomediary website may also be linked a merchant's website for access to data about availability of products or services, pricing, etc. The foregoing has been in terms of a web page showing a listing or table of merchants. The foregoing discussion would also apply to a web page with a listing of goods or services by category. Listed goods or services products could be associated with merchants selling the desired goods or services.

Still further, proximity searching means may be presented to the consumer for finding nearest neighbors to a displayed item on the infomediary website relative to specified attributes of an item. In this regard, U.S. Pat. No. 5,983,220, entitled "Supporting Intuitive Decision In Complex Multi-Attribute Domains Using Fuzzy, Hierarchical Expert Models", commonly owned by the assignee of the present invention, is hereby expressly incorporated by reference for all that is taught therein.

A membership program may be used on the infomediary website, allowing registered members preferred access to information, automated notifications about subject matter within their scope of interest, or other preferential treatment. A registered member would be someone providing predetermined categories of information called for by the infomediary website, such as personal data, shopping preferences, participation fees, etc. The infomediary website could notify a registered member of discounted prices for goods or service in which they have expressed an interest. The infomediary website could also arrange for incentive programs for its members such as special discounts, rebates, frequent buyer programs, etc. could be offered by or through the infomediary. For example, registered members purchasing from a participating merchant could receive a rebate according to predefined terms of a rebate program.

Figure 16:
FIG. 16 is an example web page from an infomediary website showing features of the present invention.

FIGS. 17–23 show web pages illustrating features in accordance with the foregoing discussion. The web pages could be served by presentation server 26 in earlier Figures. FIG. 16 is an example of a home page for an infomediary web site. The page describes a number of products and services that may be browsed or searched by a consumer visiting the web site. The page also announces incentive programs and special offer programs. The names, descriptions, and symbols on the web pages of FIGS. 17 to 23 may be presented in the form of links to other pages inside or outside the infomediary website. The web page also has means to allow a consumer to search for products or services via categories listed on a pull down menu. A search prompt is presented by selecting a category from the pull down menu and clicking on the go button. The web page of FIG. 16 also presents certain popular products in the left margin of the page.

Figure 17:
FIG. 17 is an example web page from the infomediary website of FIG. 16 showing features of the present invention.

FIG. 17 is a web page from the infomediary web site of FIG. 16. This page represents the "Computer Hardware & Software" category from the page of FIG. 16, and may be reached by clicking on that category name in the web page of FIG. 16. The page lists subcategories of products. The page also includes a search prompt for searching by product identifiers, such as SKU numbers. There are additional pull-down menus to produce search prompts to search or find other categories or merchants. Incentive programs and special offers may also may be presented or accessed through the web page.

FIG. 18 is a web page from the infomediary web site of FIG. 16. This page represents the "PDAs" category shown on the Computer Hardware & Software category web page of FIG. 17. The "PDAs" web page of FIG. 18 may be reached by clicking on that category name on web page in FIG. 17. The Web page of FIG. 18 lists merchants carrying PDA products. The merchant names are associated with overall ratings in the form of 1–5 stars. The ratings may also be distinguished as to merchants that participate in a customer ratings program. A consumer visiting the infomediary site may learn details of such a program by a linked web page describing the program, e.g. the web page of FIGS. 19a–b. Merchants that allow post-purchase surveys of consumers are indicated with gold rating stars and non-participating merchants with silver stars, as described in FIGS. 19a–b.

A consumer can learn more about a merchant listed on the web page of FIG. 18 by clicking on the merchants' name. The merchant name may, for example, link to further ratings information or provide comments or reviews by consumers or others. The web pages with such information may be on or off the website of the infomediary. Special offers such as rebates are also associated with a listed merchant, as seen in FIG. 18. An "on time" rating attribute is also associated with a listed merchant. The ratings and other information presented on the web page may be derived from one or more of the processing modules of discussed above. including the DS and SLF processing modules. Other attributes, such as described for surveys 100 and 200 of the earlier Figures may be associated with a listed merchant. As indicated in FIG. 18, searching and sorting features may also be included on the web page to search or sort for desired rating attributes, product pricing, product characteristics, product availability, etc.

Figure 20:
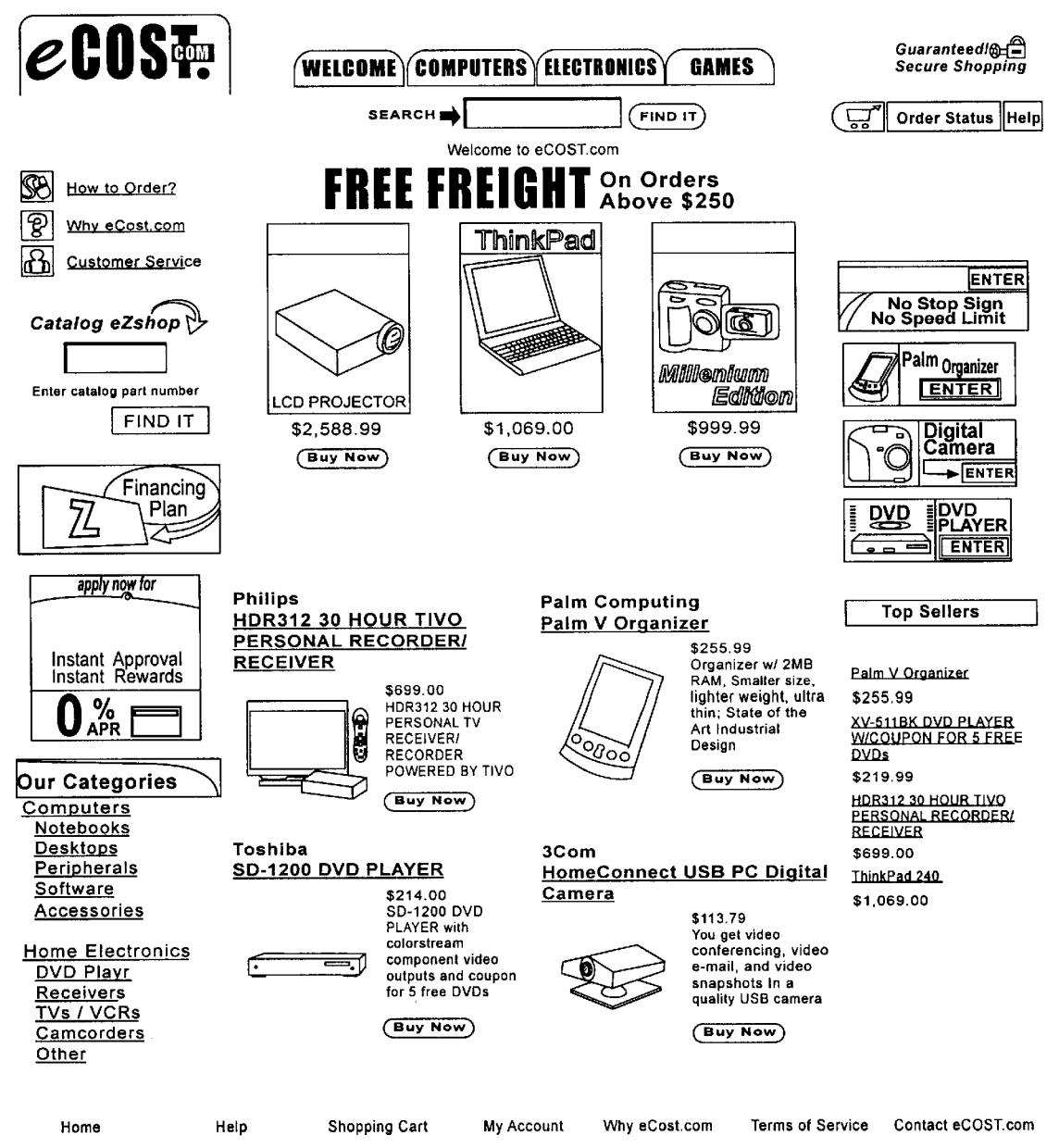

A dynamic activity-level icon, as discussed above may also be associated with merchants listed on the web page of FIG. 18. In this case it is a dot of varying size, the larger the dot the higher the activity level. Consumers may select to browse or shop at a merchant's website by clicking on the "GO SHOP" icon seen of the web page. The icon provides a direct link to the merchant's website. Preferably the link is to a web page on the merchant's website that includes the product of interest. FIG. 20 represents the web page of the merchant named "eCost.com". The web page shows price and product information for a PDA.

The web page of FIG. 18 also lists in the right hand margin a number of PDA products considered to be top picks according to selected criteria believed to be relevant to consumers. Clicking on a product may take the consumer to a list of one or more merchants offering the product.

The web page of FIG. 18 page also includes search and sort prompts for searching by merchant ratings, product identifiers or characteristics, such as manufacturer or keywords. There are additional pull down menus to produce search prompts to search or find other categories or merchants. Incentive programs and special offers may also may be presented or accessed through the web page.

An example referral incentive program offered on the infomediary web site is described on the web page of FIG. 21.

Figure 22:
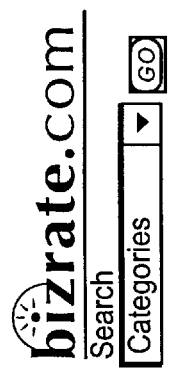
FIG. 22 is an example web page from the infomediary website of FIG. 16 showing features of the present invention.

An example of special offers presented on the infomediary web site is described on the web page of FIG. 22.

Figure 23:
FIG. 23 is an example web page from the infomediary website of FIG. 16 showing features of the present invention.

An example form for becoming a registered member of the infomediary is presented on the web page of FIG. 23.

The foregoing embodiments are for illustrative purposes and are not intended to be limiting, persons-skilled in the art capable of appreciating other embodiments from the scope and spirit of the foregoing teachings.

What is claimed:

1. A system for stabilizing data comprising:
   one or more databases containing data for processing;
   a plurality of processing modules in communication with each other and/or the one or more databases, each processing module performing a predefined operation on data retrieved from a database or received from a processing module, at least one processing module being a data stabilizer processing module, the data stabilizer smoothing noisy or variable data using a computational solution of a minimum variance Bayesian method;
   one or more databases in communication with a processing module that outputs data that has passed through the data stabilizer processing module, the one or more databases storing the stabilized data received from the processing module; and
   a presentation server in communication with a database with the stabilized data for presenting selected items of the data.

2. The system of claim 1 wherein the presentation server is accessible to a plurality of remote computer systems via a network.

3. The system of claim 2 wherein the presentation server is accessible by a merchant and a consumer computer system.

4. The system of claim 1 wherein the system further comprises a data capture server capable of receiving data from one or more data sources over the Internet, the data capture server providing data to the one or more databases in communication with a data stabilizer processing module.

5. The system of claim 4 wherein the stabilized data on the presentation server is accessible by a plurality of remote computer systems via the Internet.

6. The system of claim 5 wherein the remote computer systems include a plurality of merchant computer systems.

7. The system of claim 5 wherein the remote computer systems include consumer computer systems.

8. The system of claim 4 further comprising a survey server that serves a survey questionnaire to a data source comprising remote computer systems so that a user of a remote computer system can complete the survey questionnaire, a completed survey questionnaire containing data being returnable to the data capture server over the Internet.

9. The system of claim 8 wherein the remote computer systems comprise a plurality of consumer computer systems and the completed survey questionnaire includes data relating to an online transaction between a consumer and a merchant.

10. The system of claim 4 wherein the presentation server is accessible to a plurality of remote computer systems via a network, wherein the presentation server serves remote computer systems stabilized data comprising data stabilizers relating to online transactions between consumers and merchants, the ratings being based on data collected in the data capture server from data sources comprising a plurality of consumer computer systems.

11. The system of claim 1 wherein data input to the data stabilizer processing module is processed using an adaptation of an Extended Kalman Filter.

12. The system of claim 11 wherein the data stabilizer processing module uses the equation $\hat{x}_i = \hat{x}_{i-1} + K_i[\tilde{A}_i - A_{i/i-1}]$ with $\hat{x}_i = [c_{o,i}, c_{1,i}, c_{2,i}]^T$ and $$x_{i+1} = \begin{bmatrix} 1 & \Delta t_i & \Delta t_i^2 \\ 0 & 1 & 2\Delta t_i \\ 0 & 0 & 1 \end{bmatrix} x_i$$

to stabilize values of data.

13. The system of claim 12 wherein one or more observations are related to state by $A_{i/i-1} = [0\ 0\ 1]\hat{x}_{i-1}$.

14. The system of claim 12 wherein the Extended Kalman Filter is adapted for stabilizing data collected from consumer survey questionnaires relating to online transactions between consumers and merchants.

15. The system of claim 14 wherein the Extended Kalman Filter processes data via the equation $\hat{x}_i = \hat{x}_{i-1} + K_i[\tilde{A}_i - A_{i/i-1}]$ with $\hat{x}_i = [c_{o,i}, c_{1,i}, c_{2,i}]^T$ and $$x_{i+1} = \begin{bmatrix} 1 & \Delta t_i & \Delta t_i^2 \\ 0 & 1 & 2\Delta t_i \\ 0 & 0 & 1 \end{bmatrix} x_i$$

to stabilize values of data, and the data deriving from ratings of online merchants, information derived from the processed data being passed to a presentation server, the information being accessible to one or more remote computer systems of consumers in communication with the presentation server.

16. The system of claim 14 wherein the data stabilizer module is in communication with another processing module that receives and processes data before the stabilized data is passed to the presentation server.

17. The system of claim 1 wherein the data stabilizer processing module is an adaptation of an Extended Kalman Filter.

18. A system for stabilizing data comprising:
- a data capture server capable of communicating with one or more data sources over a computer network and receiving from the data source, data related to an ecommerce transaction;
- one or more databases for receiving data from the data capture server;
- a plurality of processing modules in communication with each other and/or the one or more databases, each processing module performing a predefined operation on data stored in a database or received from a processing module, one processing module comprising a data stabilizer processing module and one processing module comprising a statistical analysis processing module in communication with the data stabilizer processing module, the data stabilizer processing module being adapted to stabilize data relating to online transactions between merchants and consumers wherein the data stabilizer processing module uses an adaptation of an Extended Kalman Filter in the process of producing stabilized values;
- one or more databases in communication with the one or more processing modules for storing stabilized data received from a selected processing module; and
- a presentation server in communication with the one or more databases having stabilized data, the presentation server being capable of accessing the stabilized data and presenting selected items of data as data or information, the presentation server being accessible to remote computer systems via a network.

19. The system of claim 18 wherein the presentation server may be accessed by remote computers over a network comprising the Internet.

20. The system of claim 18 wherein the Extended Kalman Filter uses the equation $\hat{x}_i = \hat{x}_{i-1} + K_i[\tilde{A}_i - A_{i/i-1}]$ in producing stabilized values.

21. The system of claim 20 wherein the one or more data sources include consumer computer systems, and the presentation server is in communication with one or more merchant computer systems to communicate stabilized data relating to online transactions between consumers and merchants, the stabilized data originating as raw data from consumer computer systems.

22. The system of claim 18 wherein each said network comprises the Internet.

23. A computer system having means for generating web pages containing e-commerce data or information that has been derived from a data stabilizer processing module, the data stabilizer smoothing noisy or variable data using a computational solution of a minimum variance Bayesian method.

24. The computer system of claim 23 herein the generated web pages are accessible to a plurality of remote consumer computer systems over a computer network.

25. The computer system of claim 24 wherein a web page includes evaluation information about merchant performance, the information being derived from data processed by the data stabilizer processing module.

26. The computer system of claim 24 wherein the web pages include ratings of merchants, the ratings being derived from data processed by the data stabilizer processing module.

27. The computer system of claim 23 wherein data input to the data stabilizer processing module is processed using an adaptation of an Extended Kalman Filter.

28. The computer system of claim 27 wherein the data stabilizer processing module uses the equation $$\hat{x}_i = \hat{x}_{i-1} + K_i[\tilde{A}_i - A_{iji-1}] \text{ with } \hat{x}_i = [c_{0,1}, c_{1,i}, c_{2,i}]^T \text{ and}$$

$$x_{i+1} = \begin{bmatrix} 1 & \Delta t_i & \Delta t_i^2 \\ 0 & 1 & 2\Delta t_i \\ 0 & 0 & 1 \end{bmatrix} x_i$$

to stabilize values of data.

29. The computer system of claim 28 wherein one or more observations are related to state by $A_{i/i-1} = [0\ 0\ 1]\hat{x}_{i-1}$.

30. The computer system of claim 27 wherein the Extended Kalman Filter is adapted for stabilizing data collected from consumer survey questionnaires relating to an online transaction between consumers and merchants.

31. A computer system having means for generating web pages containing e-commerce data or information that has been derived from a data stabilizer processing module, the data stabilizer smoothing noisy or variable data using a computational solution of a minimum variance Bayesian method.

32. The computer system of claim 31 wherein the generated web pages are accessible to a plurality of remote consumer computer systems over a computer network.

33. The computer system of claim 31 wherein data input to the data stabilizer processing module is processed using an adaptation of an Extended Kalman Filter.

34. The computer system of claim 33 wherein the data stabilizer processing module uses the equation $$\hat{x}_i = \hat{x}_{i-1} + K_i[\tilde{A}_i - A_{i/i-1}] \text{ with } \hat{x}_i = [c_{0,i}, c_{1,i}, c_{2,i}]^T \text{ and}$$

$$x_{i+1} = \begin{bmatrix} 1 & \Delta t_i & \Delta t_i^2 \\ 0 & 1 & 2\Delta t_i \\ 0 & 0 & 1 \end{bmatrix} x_i$$

to stabilize values of data.

35. The computer system of claim 34 wherein one or more observations are related to state by $A_{i/i-1}=[0\ 0\ 1]\hat{x}_{i-1}$.

36. The computer system of claim 33 wherein the Extended Kalman Filter is adapted for stabilizing data collected from consumer survey questionnaires relating to an online transaction between consumers and merchants.

37. A method of stabilizing data values comprising:

transferring data relating to e-commerce to a data stabilizer processing module, the data stabilizer smoothing noisy or variable data using a computational solution of a minimum variance Bayesian method; stabilizing the transferred data; and presenting the data via a computer system to one or more remote computer systems.

38. The method of claim 37 further comprising making the stabilized data on the presentation server accessible to a plurality of remote computer systems via a network.

39. The method of claim 38 wherein the Internet comprises the network.

40. The method of claim 39 wherein the remote computer systems comprise consumer computer systems.

41. The method of claim 40 wherein the method further comprises capturing the data in a data capture server and then transferring captured data to the data stabilizer processing module.

42. The method of claim 38 wherein the remote computer systems include a plurality of merchant computer systems.

43. The method of claim 37 wherein the method further comprises capturing the data in a data capture server and then transferring captured data to the data stabilizer processing module.

44. The method of claim 43 wherein the data is captured from survey questionnaires.

45. The method of claim 44 wherein the survey questionnaires are completed by consumers and delivered to a data capture server over the Internet.

46. The method of claim 37 wherein the data includes a value comprising a mean value of an attribute on a survey questionnaire, the mean being determined based on a plurality of transactions between a consumer and merchant over a defined interval.

47. The method of claim 37 wherein the data stabilizer processing module. uses the equation $\hat{\underline{x}}_i=\hat{\underline{x}}_{i-1}+K_i[\tilde{A}_i-A_{i/i-1}]$ with $\hat{\underline{x}}_i=[c_{o,i}, c_{1,i}, c_{2,i}]^T$ and $$x_{i+1} = \begin{bmatrix} 1 & \Delta t_i & \Delta t_i^2 \\ 0 & 1 & 2\Delta t_i \\ 0 & 0 & 1 \end{bmatrix} x_i$$

to stabilize values of data.

48. The method of claim 47 wherein one or more observations are related to state by $A_{i/i-1}=[0\ 0\ 1]\hat{x}_{i-1}$.

49. The method of claim 37 wherein an Extended Kalman Filter adapted for stabilizing data collected from consumer survey questionnaires relating to an online transaction between sellers and buyers is used in the processing module.

50. A method of serving stabilized data or information relating to e-commerce comprising providing a computer system with means for generating web pages containing data or information relating to ecommerce that has been derived from a data stabilizer processing module the data stabilizer smoothing noisy or variable data using a computational solution of a minimum variance Bayesian method, the generated web pages being accessible to a plurality of remote seller computer systems over a computer network.

51. The method of claim 50 wherein the network comprises the Internet.

52. The method of claim 50 wherein a web page includes evaluation information about a seller's performance, the information being derived from data processed by the data stabilizer processing module.

53. The method of claim 52 wherein the data stabilizer is adapted for stabilizing data collected from consumer survey questionnaires relating to an online transaction between consumer-buyers and merchant-sellers.

54. The method of claim 53 wherein data input to the data stabilizer processing module is processed using an adaptation of an Extended Kalman Filter.

55. The method of claim 54 wherein the data stabilizer processing module uses the equation $\hat{\underline{x}}_i=\hat{\underline{x}}_{i-1}+K_i[\tilde{A}_i-A_{i/i-1}]$ with $\hat{\underline{x}}_i=[c_{o,i}, c_{1,i}, c_{2,i}]^T$ and $$x_{i+1} = \begin{bmatrix} 1 & \Delta t_i & \Delta t_i^2 \\ 0 & 1 & 2\Delta t_i \\ 0 & 0 & 1 \end{bmatrix} x_i$$

to stabilize values of data.

56. The method of claim 55 wherein one or more observations are related to state by $A_{i/i-1}=[0\ 0\ 1]\hat{x}_{i-1}$.

57. The method of claim 54 wherein the Extended Kalman Filter is adapted for stabilizing data collected from consumer survey questionnaires relating to an online transaction between consumers and merchants.

58. The method of claim 50 wherein data input to the data stabilizer processing Module is processed using an adaptation of an Extended Kalman Filter.

59. The method of claim 58 wherein the data stabilizer processing module uses the equation $\hat{\underline{x}}_i=\hat{\underline{x}}_{i-1}+K_i[\tilde{A}_i-A_{i/i-1}]$ with $\hat{\underline{x}}_i=[c_{o,i}, c_{1,i}, c_{2,i}]^T$ and $$x_{i+1} = \begin{bmatrix} 1 & \Delta t_i & \Delta t_i^2 \\ 0 & 1 & 2\Delta t_i \\ 0 & 0 & 1 \end{bmatrix} x_i$$

to stabilize vialues of data.

60. The method of claim 59 wherein one or more observations are related to state by $A_{i/i-1}=[0\ 0\ 1]\hat{x}_{i-1}$.

61. A method of serving stabilized data or information relating to e-commerce comprising providing a computer system with means for generating web pages containing data or information relating to e-commerce that has been derived from a data stabilizer processing module the data stabilizer smoothing noisy or variable data using a computational solution of a minimum variance Bayesian method, the generated web pages being accessible to a plurality of remote buyer computer systems over a computer network.

62. The method of claim 61 wherein the network comprises the Internet.

63. The method of claim 61 wherein the web pages include ratings of seller's, the ratings being derived from data processed by the data stabilizer processing module.

64. The method of claim 63 wherein the data stabilizer is adapted for stabilizing data collected from consumer survey questionnaires relating to an online transaction between consumer and merchants.

65. The method of claim 64 wherein data input to the data stabilizer processing modules is processed using an adaptation of an Extended Kalman Filter.

66. The method of claim 65 wherein the data stabilizer processing module uses the equation $\hat{\underline{x}}_i = \hat{\underline{x}}_{i-1} + K_i[\tilde{A}_i - A_{i/i-1}]$ with $\hat{\underline{x}}_i = [c_{o,i}, c_{1,i}, c_{2,i}]^T$ and $$x_{i+1} = \begin{bmatrix} 1 & \Delta t_i & \Delta t_i^2 \\ 0 & 1 & 2\Delta t_i \\ 0 & 0 & 1 \end{bmatrix} x_i$$

to stabilize values of data.

67. The method of claim 65 wherein one or more observations are related to state by $A_{i/i-1} = [0\ 0\ 1]\hat{x}_{i-1}$.

68. The method of claim 65 wherein the Extended Kalman Filter is adapted for stabilizing data collected from consumer survey questionnaires relating to an online transaction between consumers and merchants.

69. The method of claim 61 wherein data input to the data stabilizer processing module is processed using an adaptation of an Extended Kalman Filter.

70. The method of claim 57 wherein the data stabilizer processing module uses the equation $\hat{\underline{x}}_i = \hat{\underline{x}}_{i-1} + K_i[\tilde{A}_i - A_{i/i-1}]$ with $\hat{\underline{x}}_i = [c_{o,i}, c_{1,i}, c_{2,i}]^T$ and $$x_{i+1} = \begin{bmatrix} 1 & \Delta t_i & \Delta t_i^2 \\ 0 & 1 & 2\Delta t_i \\ 0 & 0 & 1 \end{bmatrix} x_i$$

to stabilize values of data.

71. The method of claim 70 wherein one or more observations are related to state by $A_{i/i-1} = [0\ 0\ 1]\hat{x}_{i-1}$.

72. A method of serving stabilized data or information relating to e-commerce comprising providing a computer system having means for generating web pages containing data or information relating to product ratings that has been derived from a data stabilizer processing module the data stabilizer smoothing noisy or variable data using a computational solution of a minimum variance Bayesian method, the web pages being accessible to a plurality of remote computer systems over the Internet.

* * * * *